US005940530A

United States Patent [19]
Fukushima et al.

[11] Patent Number: 5,940,530
[45] Date of Patent: Aug. 17, 1999

[54] BACKLIT SCENE AND PEOPLE SCENE DETECTING METHOD AND APPARATUS AND A GRADATION CORRECTION APPARATUS

[75] Inventors: Tsumoru Fukushima, Kyoto; Haruo Yamashita, Ibaraki; Katsuhiro Kanamori, Kawasaki, all of Japan

[73] Assignee: Matsushita Electric Industrial Co., Ltd., Osaka-fu, Japan

[21] Appl. No.: 08/826,333

[22] Filed: Mar. 27, 1997

Related U.S. Application Data

[62] Division of application No. 08/504,658, Jul. 20, 1995, Pat. No. 5,715,377.

[30] Foreign Application Priority Data

Jul. 21, 1994 [JP] Japan ..................................... 6-169084
Aug. 23, 1994 [JP] Japan ..................................... 6-198308

[51] Int. Cl.[6] .................................................. H04N 1/60
[52] U.S. Cl. .......................... 382/164; 382/284; 358/520; 358/540
[58] Field of Search .................................... 358/520, 521, 358/527, 540, 164; 382/167, 274, 284; 348/586–588, 597–598, 602–603, 650, 652, 655; H04N 1/60

[56] References Cited

U.S. PATENT DOCUMENTS

| | | |
|---|---|---|
| 4,707,119 | 11/1987 | Terashita . |
| 4,792,979 | 12/1988 | Nomura et al. . |
| 5,012,333 | 4/1991 | Lee et al. . |
| 5,181,105 | 1/1993 | Udagawa et al. . |
| 5,296,920 | 3/1994 | Sakaue et al. . |
| 5,317,427 | 5/1994 | Ichikawa . |
| 5,384,601 | 1/1995 | Yamashita et al. . |
| 5,420,704 | 5/1995 | Winkelman . |
| 5,422,738 | 6/1995 | Ishihara et al. . |
| 5,434,683 | 7/1995 | Sekine et al. . |
| 5,450,217 | 9/1995 | Eschbach et al. . |
| 5,557,688 | 9/1996 | Nakamura ................................ 358/500 |

FOREIGN PATENT DOCUMENTS

| | | |
|---|---|---|
| 62-200471 | 9/1987 | Japan . |
| 63-61578 | 3/1988 | Japan . |
| 4-23592 | 1/1992 | Japan . |
| 4-340875 | 11/1992 | Japan . |
| 5-122600 | 5/1993 | Japan . |

*Primary Examiner*—Kim Yen Vu
*Attorney, Agent, or Firm*—Wenderoth, Lind & Ponack, L.L.P.

[57] ABSTRACT

An apparatus for printing video images is disclosed. First the percentage of backlighting or people in the image is detected. That is, the probability of the presence of backlighting or people is detected. Then, the density gradation table is modified based on the detection result, and the presence of backlighting or the presence of people in the image is evaluated based on optical information, to select the best density gradation table from among plural density gradation tables, or to synthesize the best density gradation table. A luminance table is generated using the optimized density gradation table, and gradation correction of the image is then accomplished using that luminance table.

23 Claims, 23 Drawing Sheets

Fig.16A

BASIC DENSITY GRAD TABLE

| INPUT | OUTPUT |
|---|---|
| 0 | 6 |
| 1 | 6 |
| 2 | 6 |
| 3 | 6 |
| .. | .. |
| 50 | 15 |
| .. | .. |
| 60 | 18 |
| .. | .. |
| 70 | 21 |
| .. | .. |
| 252 | 255 |
| 253 | 255 |
| 254 | 255 |
| 255 | 255 |

Fig.16B

CORRECTED DENSITY GRAD TABLE

| INPUT | OUTPUT |
|---|---|
| 0 | 6 |
| 1 | 6 |
| 2 | 6 |
| 3 | 6 |
| .. | .. |
| 50 | 33 |
| .. | .. |
| 60 | 39 |
| .. | .. |
| 70 | 46 |
| .. | .. |
| 252 | 255 |
| 253 | 255 |
| 254 | 255 |
| 255 | 255 |

Fig.16C

LUMI CORRECTION TABLE

| INPUT | OUTPUT |
|---|---|
| 0 | 0 |
| 1 | 0 |
| 2 | 0 |
| 3 | 1 |
| .. | .. |
| 50 | 75 |
| .. | .. |
| 60 | 80 |
| .. | .. |
| 70 | 110 |
| .. | .. |
| 252 | 255 |
| 253 | 255 |
| 254 | 255 |
| 255 | 255 |

Fig.16E

DENSITY LUMI CONVERSION TABLE

| INPUT | OUTPUT |
|---|---|
| 0 | 255 |
| 1 | 251 |
| 2 | 247 |
| 3 | 244 |
| .. | .. |
| 50 | 120 |
| .. | .. |
| 60 | 103 |
| .. | .. |
| 70 | 89 |
| .. | .. |
| 252 | 6 |
| 253 | 6 |
| 254 | 6 |
| 255 | 6 |

Fig.16D

UNCORRECTED TABLE

| INPUT | OUTPUT |
|---|---|
| 0 | 6 |
| 1 | 6 |
| 2 | 6 |
| 3 | 6 |
| .. | .. |
| 50 | 50 |
| .. | .. |
| 60 | 60 |
| .. | .. |
| 70 | 70 |
| .. | .. |
| 252 | 255 |
| 253 | 255 |
| 254 | 255 |
| 255 | 255 |

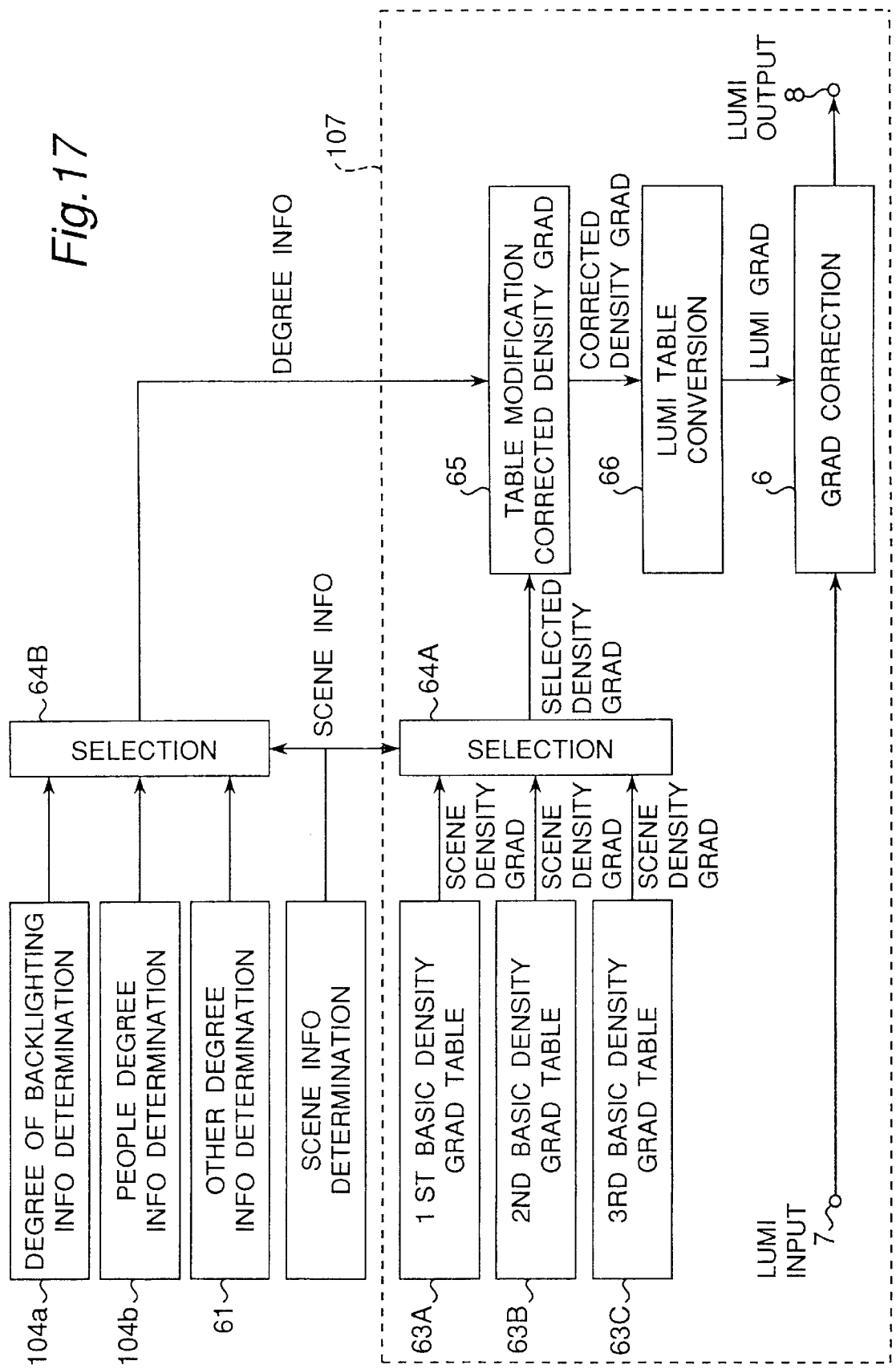

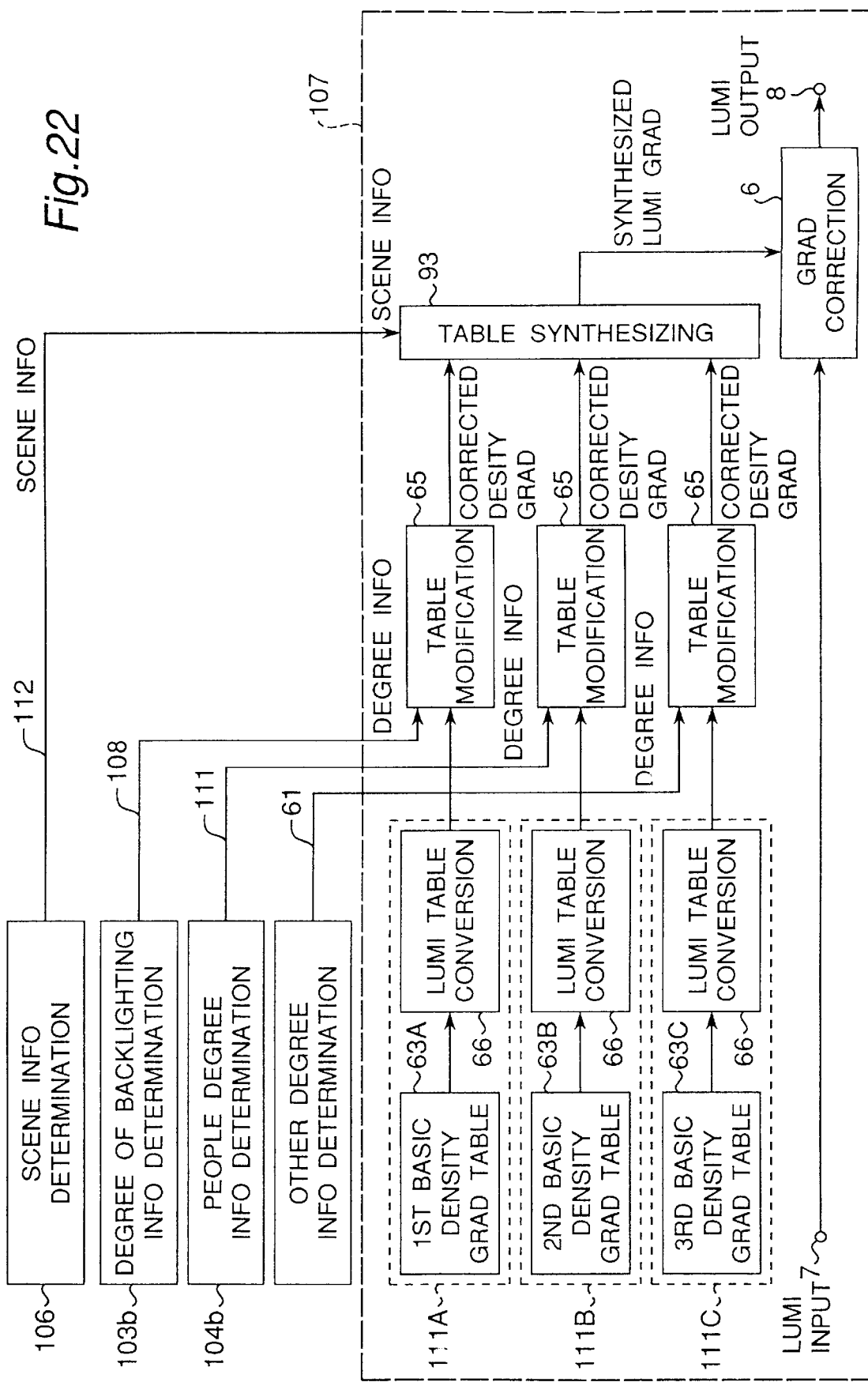

BACKLIT SCENE AND PEOPLE SCENE DETECTING METHOD AND APPARATUS AND A GRADATION CORRECTION APPARATUS

This is a divisional application of Ser. No. 08/504,658, filed Jul. 20, 1995, now U.S. Pat. No. 5,715,377.

FIELD OF THE INVENTION

The present invention relates to the gradation correction apparatus of a video apparatus, such as a video printer, for producing hard copy output of video signals.

DESCRIPTION OF THE PRIOR ART

It has become possible with the development in recent years of hard copy technologies, and particularly full-color hard copy technologies, to faithfully reproduce an image using sublimation-type thermal transfer methods and other printing technologies. Depending upon the recording materials and image processing methods applied, color reproduction equivalent to that achieved with silver halide photography has become possible, and even resolution approaches that of silver halide photography with the use of HiVision [HDTV] and other high resolution video signals.

However, the images and videos input to video printers are often recorded by amateurs using consumer movie cameras. Videos recorded outdoors are recorded without specialized video lights, and in many cases people are recorded in backlit scenes, resulting in the faces of the people becoming dark when such scenes are reproduced as is.

Technologies are therefore necessary for determining whether the input scene is a backlit scene, and, if determined to be backlit, for increasing image luminance and saturation to beautifully reproduce dark faces. Technologies are also needed to reproduce scenes containing close-ups of peoples' faces to particularly achieve a beautiful skin tone balance. To achieve this, technologies for evaluating the presence of people are also necessary.

Furthermore, video signals are reproduced by additive color mixing using color difference, R (red), G (green), and B (blue), hard copies are reproduced by subtractive color mixing using Y (yellow), M (magenta), and C (cyan), and the dynamic ranges and reproducibility of these methods differ greatly.

For example, skin tones viewed on a CRT are not surrounded by a reference for comparison, and are therefore compared with other colors in the CRT to determine whether the skin tones are acceptable or not, but in a hard copy output, the skin tones of one's own hands can be used for comparison with the skin tones in the hard copy, and "acceptable" skin tone becomes an absolute quantity. As a result, skin tones that are approximately 0.5 greater than the density on paper are considered acceptable in hard copy output.

The absolute density is thus important in hard copy output, and acceptable reproducibility differs greatly from that with TV and VCR signals.

With hard copy output there is also the visual phenomenon of changes in the extremely dark and bright density regions being difficult to perceive, and it is therefore preferable to compress gradations in these ranges to emphasize intermediate tones. Furthermore, there is also the visual phenomenon that changes in gradation are more perceptible in the extremely bright region than in the extremely dark region, and it is therefore preferable to compress the bright density region more gently than the dark density region.

However, it is extremely difficult to achieve these characteristics of density using luminance because information that is linear with respect to density is non-linear with respect to luminance, and extremely complex operations are required to achieve gradations optimized for hard copy output with the luminance information. As a result, achieving the visual characteristics characteristic of hard copy output by means of a simple method is difficult in gradation correction using the luminance information. A technology for optimally correcting the differences in dynamic range and reproducibility is therefore needed.

There are two technologies of the prior art for evaluating backlit scenes: one is provided in the video camera for automatically controlling the iris to optimally control the exposure so that the subject does not become dark by means of center-weighted metering (Japanese TOKKAI H5-122600) and one is for gradation correction of degraded images by optimally selecting the gradation curve (Japanese TOKKAI H3-106269). However, both of these methods evaluate backlit scenes by calculating the luminance ratio between the center of the screen and the overall luminance, and are characterized by assuming either that the subject is always in the center of the screen, or that the average luminance of the subject is equivalent to the amount of backlighting. There is also a method providing slightly more freedom in the positioning of the subject by dividing the screen into blocks, and locating the primary subject based on the correlation to the luminance distribution in the center blocks of the screen (Japanese TOKKAI H4-340875), and for eliminating the effects of bright colored or dark colored clothing worn by the subject when obtaining the average luminance of the subject based on special split-field metering of the screen (Japanese TOKKAI H5-122600).

Prior art technologies for determining whether people are in the picture include one for detecting hues near skin tone hues (Japanese TOKKAI H4-23592), and one using image area division in a two-dimensional histogram of hue and saturation, but both of these only define a skin tone-like area in the color plane, and process and evaluate only color.

In addition, prior art technologies for gradation correction primarily determine and apply gradation correction to the luminance information, e.g., applying gamma correction by providing RGB conversion tables suited to the input environment Japanese TOKKAI 62-200471), and applying correction during conversion of RGB values to density values so that densities in the highlight areas and densities in the shadow areas are within the dynamic range (Japanese TOKKAI 63-061578). It is therefore extremely difficult to allow for the visual properties characteristic of hard copy output as described above.

Furthermore, because a method for correcting luminance to achieve a uniform image density distribution ("An image density distribution correction means using a non-linear amplifier, and its processing results," Technical Report of IEICE.IE92-112 (1993-01)) corrects to achieve a uniform image density, correction optimized for backlighting, people subjects, and other scenes is not accomplished.

Because conventional backlight evaluation methods are premised on the subject being in the image center, when the subject is offset on screen to the right or left, or if there are two subjects separated in the screen, the backlighting evaluation is not correctly executed.

A false backlight determination may also occur when only the background is dark, or when there is a large black area in the screen such as in images of a woman with long black hair. Moreover, the degree of backlighting will change greatly with black clothes and white clothes even under the same lighting conditions, and the standard for backlight calculations is vague. On the other hand, to evaluate people in the image, many technologies map the color distribution on the screen to a color map, and detect those areas with a high probability of being skin tones based on hue and saturation, because creating models for the human form is difficult. However, the hue and saturation of skin tones are offset by the effects of lighting when outdoors. Skin tone color also varies according to race and any cosmetics applied.

Moreover, skin color varies infinitely in the natural world, and problems such as overdetection of skin color regions in places where peoples' faces are normally not present, such as at the bottom of the screen, is a problem.

Because gradation correction is applied by adjusting the luminance, complex operations such as logarithmic conversion are required if the density characteristics are to be considered, and density correction is difficult to achieve.

Furthermore, correction achieving optimum results for the particular scene in the image is not accomplished, and backlighting, human images, etc. are not necessarily appropriately corrected.

Considering the aforementioned problems, the present invention provides a gradation correction method whereby gradation reproduction optimized for a hard copy of the video signal can be achieved with good precision by means of a simple configuration.

SUMMARY OF THE INVENTION

To resolve the aforementioned problems, a gradation correction method according to the invention comprises: a scene information determination step for determining the scene information of the input image; a degree of brightness information determination step for determining the degree of brightness in the input image; a basic density gradation table generating step for generating as a density input and density output table according to the scene information, basic density gradation correction information that is the basis of the scene; a table modification step for modifying the basic density gradation table generated by said basic density gradation table generating method to gradation correction characteristics appropriate to the input image according to the degree of brightness determined by said degree of brightness information determination step; a luminance table conversion step for converting the table modified by said table modification step to a luminance input/luminance output table; and a gradation correction step for accomplishing gradation correction of the input image, based on the gradation correction table converted in the luminance table conversion step, by using the luminance of the input image as the input and the corrected luminance as the output.

To resolve the aforementioned problems, a gradation correction apparatus comprises: a scene information input means for determining the scene information of the input image; a degree of brightness information input means for determining the degree of brightness in the input image; a basic density gradation table generating means for generating as a density input and density output table according to the scene information, basic density gradation correction information that is the basis of the scene; a table modification means for modifying the basic density gradation table to gradation correction characteristics appropriate to the input image according to the degree of brightness determined by said degree of brightness information determination means; a luminance table conversion means for converting the table modified by said table modification means to a luminance input/luminance output table; and a gradation correction means comprising a gradation correction table of the luminance inputs and luminance outputs converted by the luminance table conversion means, and outputting a corrected luminance for the luminance of the input image input thereto.

To resolve the aforementioned problems, a gradation correction apparatus comprises: a scene information determination means for determining the scene information of the input image; a degree of brightness information determination means for determining the degree of brightness in the input image; plural basic density gradation tables each comprising the basic density input/density output gradation information for each of plural scenes in the image; a selection means for selecting from the plural density gradation tables the gradation correction information appropriate to a scene in the input image according to the scene information; a table modifying means for modifying the basic density gradation correction table selected by the selection means to achieve gradation correction characteristics appropriate to the input image according to the degree of brightness determined by said degree of brightness information determination means; a luminance table conversion means for converting the table modified by said table modification means to a luminance input/luminance output table; and a gradation correction means comprising a gradation correction table of the luminance inputs and luminance outputs converted by the luminance table conversion means, and outputting a corrected luminance for the luminance of the input image input thereto.

To resolve the aforementioned problems, a gradation correction apparatus comprises: a scene information determination means for determining the scene information of the input image; a degree of brightness information determination means for determining the degree of brightness in the input image; plural basic luminance gradation tables each comprising the basic luminance input/luminance output gradation information for each of plural scenes in the image; a selection means for selecting from the plural luminance gradation tables the gradation correction information appropriate to a scene in the input image according to the scene information; a table modifying means for modifying the basic luminance gradation correction table selected by the selection means to achieve gradation correction characteristics appropriate to the input image according to the degree of brightness determined by said degree of brightness information determination means; and a gradation correction means comprising a gradation correction table modified by the table modifying means, and outputting a corrected luminance for the luminance of the input image input thereto; and is characterized by the basic luminance gradation correction table comprising a density correction curve determined based on a combination of plural lines of different slopes in the density input/density output system pre-converted to luminance input/luminance output tables.

To resolve the aforementioned problems, a gradation correction apparatus comprises: a scene information determination means for determining as the scene information of the input image the degree of reliability of each of plural scenes; a degree of brightness information determination means for determining the degree of brightness in the input image for each of plural scenes; plural basic density gradation tables each comprising the basic density input/density output gradation information for each of the plural scenes in the image; plural table modifying means for modifying for each scene the basic density gradation tables of each of the scenes according to the degree of brightness information for each scene; a table synthesizing means for synthesizing each table modified by the table modifying means according to the degree of reliability of each scene as determined by the scene information determination means; a luminance table conversion means for converting the tables generated by the table synthesizing means to a luminance input/luminance output table; and a gradation correction means comprising a gradation correction table of the luminance inputs and luminance outputs converted by the luminance table conversion means, and outputting a corrected luminance for the luminance of the input image input thereto.

To resolve the aforementioned problems, a gradation correction apparatus comprises: a scene information determination means for determining as the scene information of the input image the degree of reliability of each of plural scenes; a degree of brightness information determination means for determining the degree of brightness in the input image for each of plural scenes; plural basic luminance gradation tables each comprising the basic luminance input/luminance output gradation information for each of plural scenes in the image; a table modifying means for modifying the basic luminance gradation correction table to achieve gradation correction characteristics appropriate to the input image according to the degree of brightness information determined by said degree of brightness information determination means; a table synthesizing means for synthesizing each table modified by the table modifying means according to the degree of reliability of each scene as determined by the scene information determination means; and a gradation correction means comprising a gradation correction table synthesized by the table synthesizing means, and outputting a corrected luminance for the luminance of the input image input thereto; and characterized by the basic luminance gradation table comprising a density correction curve pre-converted to a luminance input/luminance output table, said density correction curve determined by synthesizing, in the density input/density output coordinate system, a broken line formed by plural straight lines and a curve smoothly connecting the break points of the broken line.

To resolve the aforementioned problems, a gradation correction apparatus comprises: a block information acquisition means for dividing the input image into blocks to obtain the luminance and color information; a feature presence evaluating means for evaluating the presence of features for each feature such as backlit scenes and people scenes in the input image based on the output from the block information acquisition means; a degree information determination means for determining the degree of brightness of specific parts of the input image by means of image processing matching said features; a category classifying means for classifying the input image into individual categories based on a combination of outputs from the feature presence evaluating means; a scene information determination means for determining for each of the individual categories with what degree of reliability the input image has each of said features; and a gradation correction means for applying gradation correction optimized for the input image according to the output of the degree information determination means and the output of the scene information determination means.

By means of the method of the invention, the scene information of the input image is determined in the scene information determination step; then, the degree of brightness in the input image is determined in the degree of brightness information determination step; then, in the basic density gradation table generating step, the basic density gradation correction information that becomes the basis of the scene is generated according to the scene information as a table of density input and density output information; then, in the table modification step, the basic density gradation table generated by said basic density gradation table generating method is modified to achieve the gradation correction characteristics appropriate to the input image according to the degree of brightness determined by said degree of brightness information determination step; then, in the luminance table conversion step, the table modified by said table modification step is converted to a luminance input/luminance output table; and then, in the gradation correction step, gradation correction of the input image is accomplished by outputting a corrected luminance for the input luminance of the input image based on the gradation correction table converted in the luminance table conversion step.

By means of the constitution of another embodiment, the scene information of the input image is determined by the information input means; then, the degree of brightness in the input image is determined by the degree of brightness information input means; then, in the basic density gradation table generating means, the basic density gradation correction information that becomes the basis of the scene is generated according to the scene information as a table of density input and density output information; then, in the table modification means, the basic density gradation table is modified to achieve the gradation correction characteristics appropriate to the input image according to the degree of brightness determined by said degree of brightness information determination means; then, in the luminance table conversion means, the table modified by said table modification means is converted to a luminance input/luminance output table; and then, in the gradation correction means comprising the gradation correction table of luminance input/luminance output information converted by the luminance table conversion means, a corrected luminance is output for the input luminance of the input image.

By means of the constitution of another embodiment, the scene information of the input image is determined by the information input means; then, the degree of brightness information of the brightness of the input image is determined by the degree of brightness information determination means; then, in the selection means, the gradation correction information appropriate to a scene in the input image is selected according to the scene information from the plural basic density gradation tables each comprising the basic density input/density output gradation information for each of plural scenes in the image; then, in the table modifying means, the basic density gradation correction table selected by the selection means is modified to achieve gradation correction characteristics appropriate to the input image according to the degree of brightness determined by said degree of brightness information determination means; then, in the luminance table conversion means, the table modified by said table modification means is converted to a luminance input/luminance output table; and then, in the gradation correction means, a corrected luminance is output for the input luminance of the input image using the gradation correction table of the luminance input/luminance output information converted by the luminance table conversion means.

By means of the constitution of yet another embodiment, the scene information of the input image is determined by an apparatus controlling the luminance gradient according to the scene information in the scene information determination means; then, the degree of brightness information of the brightness of the input image is determined by the degree of brightness information determination means; then, in the selection means, the gradation correction information appropriate to a scene in the input image is selected according to the scene information from the plural basic luminance gradation tables each comprising the basic luminance input/ luminance output gradation information for each of plural scenes in the image; then, in the table modifying means, the basic luminance gradation correction table selected by the selection means is modified to achieve gradation correction characteristics appropriate to the input image according to the degree of brightness determined by said degree of brightness information determination means; then, in the gradation correction means comprising a gradation correction table modified by the table modifying means, a corrected luminance is output for the input luminance of the input image.

By means of the constitution of yet another embodiment, the degree of reliability of each of plural scenes is determined as the scene information of the input image in the scene information determination means; then, in the degree of brightness information determination means, the degree of brightness in the input image is determined for each of plural scenes; then, in the plural table modifying means, the plural basic density gradation tables, each comprising the basic density input/density output gradation information for each of the plural scenes in the image, are modified according to the degree of brightness information for each scene; then, in the table synthesizing means, each table modified by the table modifying means is synthesized according to the degree of reliability of each scene as determined by the scene information determination means; then, in the luminance table conversion means, the tables synthesized by the table synthesizing means are converted to a luminance input/luminance output table; and then, in the gradation correction means, a corrected luminance is output for the input luminance of the input image using the luminance input/luminance output gradation correction table determined by the luminance table conversion means.

By means of the constitution of still a further embodiment, the degree of reliability of each of plural scenes is determined as the scene information of the input image in the scene information determination means; then, in the degree of brightness information determination means, the degree of brightness in the input image is determined for each of plural scenes; then, in the table modifying means, the plural basic luminance gradation tables, each comprising the basic luminance input/ luminance output gradation information for each of plural scenes in the image, are modified according to the degree of brightness information for each scene determined by the degree of brightness information determination means to achieve the gradation correction characteristics appropriate to the input image; then, in the table synthesizing means, each table modified by the table modifying means is synthesized according to the degree of reliability of each scene as determined by the scene information determination means; then, in the gradation correction means comprising a gradation correction table synthesized by the table synthesizing means, a corrected luminance is output for the input luminance of the input image.

By means of the constitution of another embodiment, the input image is first roughly divided into blocks vertically and horizontally, and backlighting evaluation and people evaluation are accomplished by processing that block information. The backlighting evaluation bases the evaluation on the shape and luminance of dark areas, and can therefore evaluate backlit scenes with higher precision than the prior art without assuming that the backlit subject is present in the screen center, and can obtain a reliable degree of backlighting because human faces are inferred for evaluation. In addition, the people evaluation is based on skin color evaluation, but obtains the skin color distribution by means of a principal component analysis method including skin color tones based on candidate data from colors, evaluates the presence of people based on the angle of the distribution, and can therefore detect people relatively unaffected by changes in lighting. The degree of backlighting and the degree of reliability are respectively obtained from the backlighting evaluation and people evaluation, an optimum gradation correction curve is generated from these values, and gradation correction is accomplished.

BRIEF DESCRIPTION OF THE DRAWINGS

FIG. 16A is the content of the basic density gradation table in a second embodiment of the present invention;

FIG. 16B is the content of the density gradation table after modification in the second embodiment of the present invention;

FIG. 16C is the content of the luminance correction table in the second embodiment of the present invention;

FIG. 16D is the content of an unchanged table in the second embodiment of the present invention;

FIG. 16E is the content of the density/luminance conversion table in the second embodiment of the present invention;

FIG. 17 is a block diagram of the gradation correction apparatus in the second embodiment of the present invention;

FIG. 22 is a block diagram of a gradation correction apparatus in a fifth embodiment of the present invention.

DETAILED DESCRIPTION OF THE PREFERRED EMBODIMENTS

The gradation correction method of the first embodiment of the present invention is described below with reference to the accompanying figures.

Figure 11:
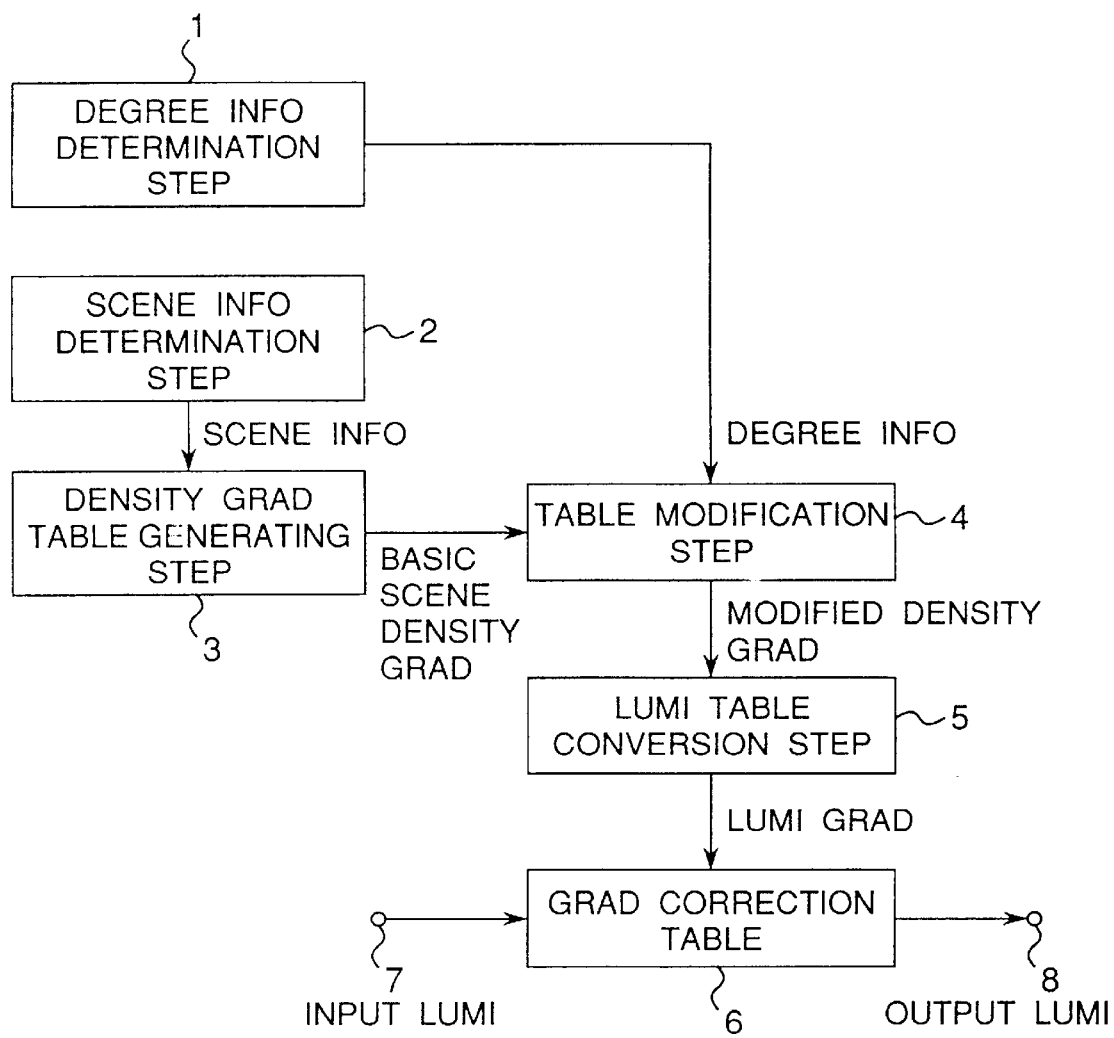
FIG. 11 is a block diagram of the gradation correction apparatus in the first embodiment of the present invention.

FIG. 11 shows the gradation correction method of the preferred embodiments of the present invention, 1 being the degree information determination step for determining the degree of brightness in the input image; 2, the scene information determination step for determining the scene information of the input image; 3, the density gradation table generating step for generating as a basic scene density gradation table of density input and density output information the gradation correction information optimized for this scene according to the scene information determined by the scene information determination step 2; 4, the table modification step for modifying the basic scene density gradation table according to the degree of brightness information determined by the degree information determination step 1; 5, the luminance table conversion step for converting the density gradation table modified by the table modification step 4 to a luminance table of luminance input/luminance output information; 6, the luminance correction step for correcting the luminance information of the input image based on the luminance table converted by the luminance table conversion step 5, i.e., the gradation correction table, and outputting the luminance information after correction; 7, the luminance information of the input image; and 8, the output luminance information corrected by the luminance correction step 6.

These steps are achieved in a microcomputer by means of software in the present embodiment.

Figure 12:
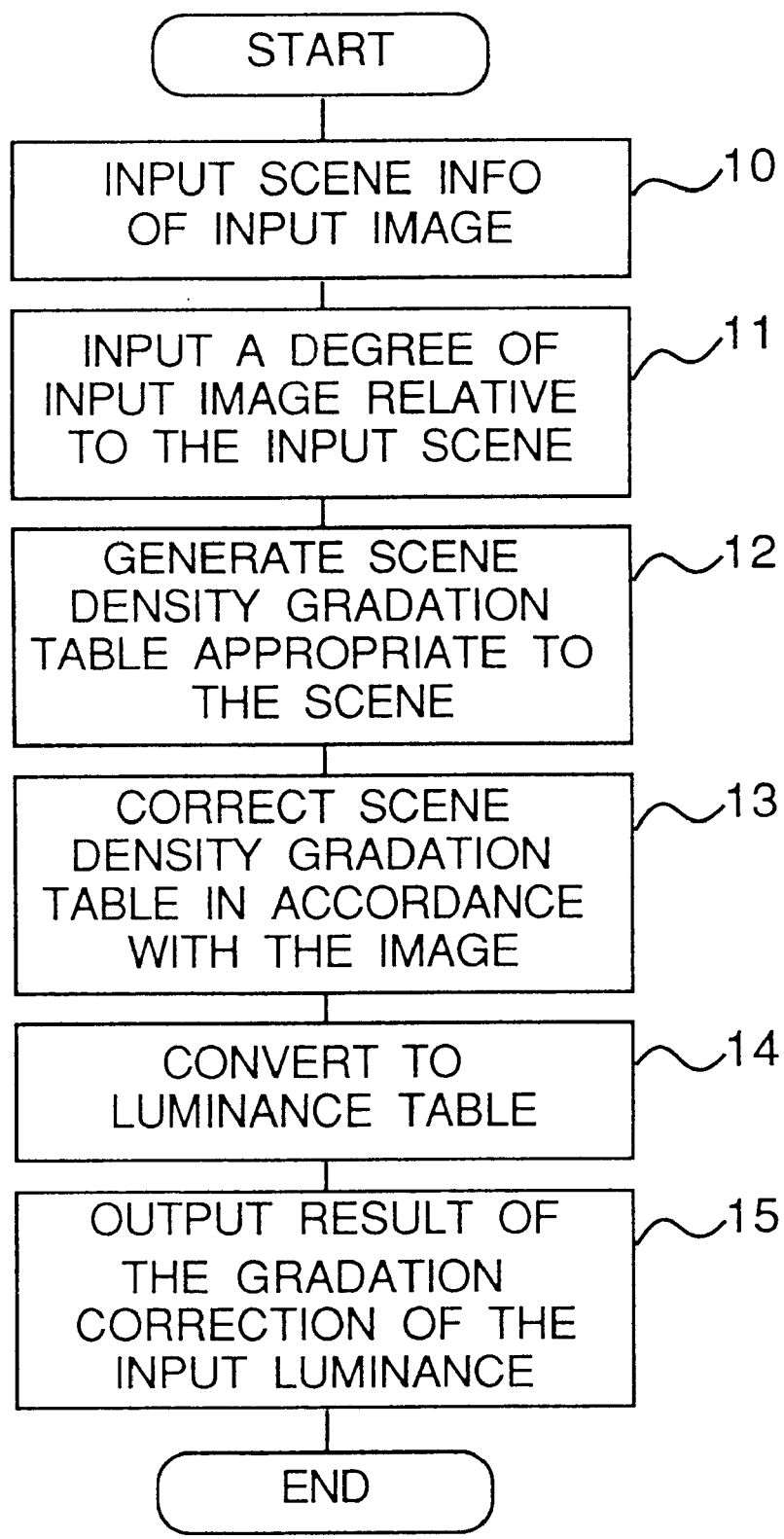
FIG. 12 is a flow chart of the signal process in the first embodiment of the present invention.
Figure 13:
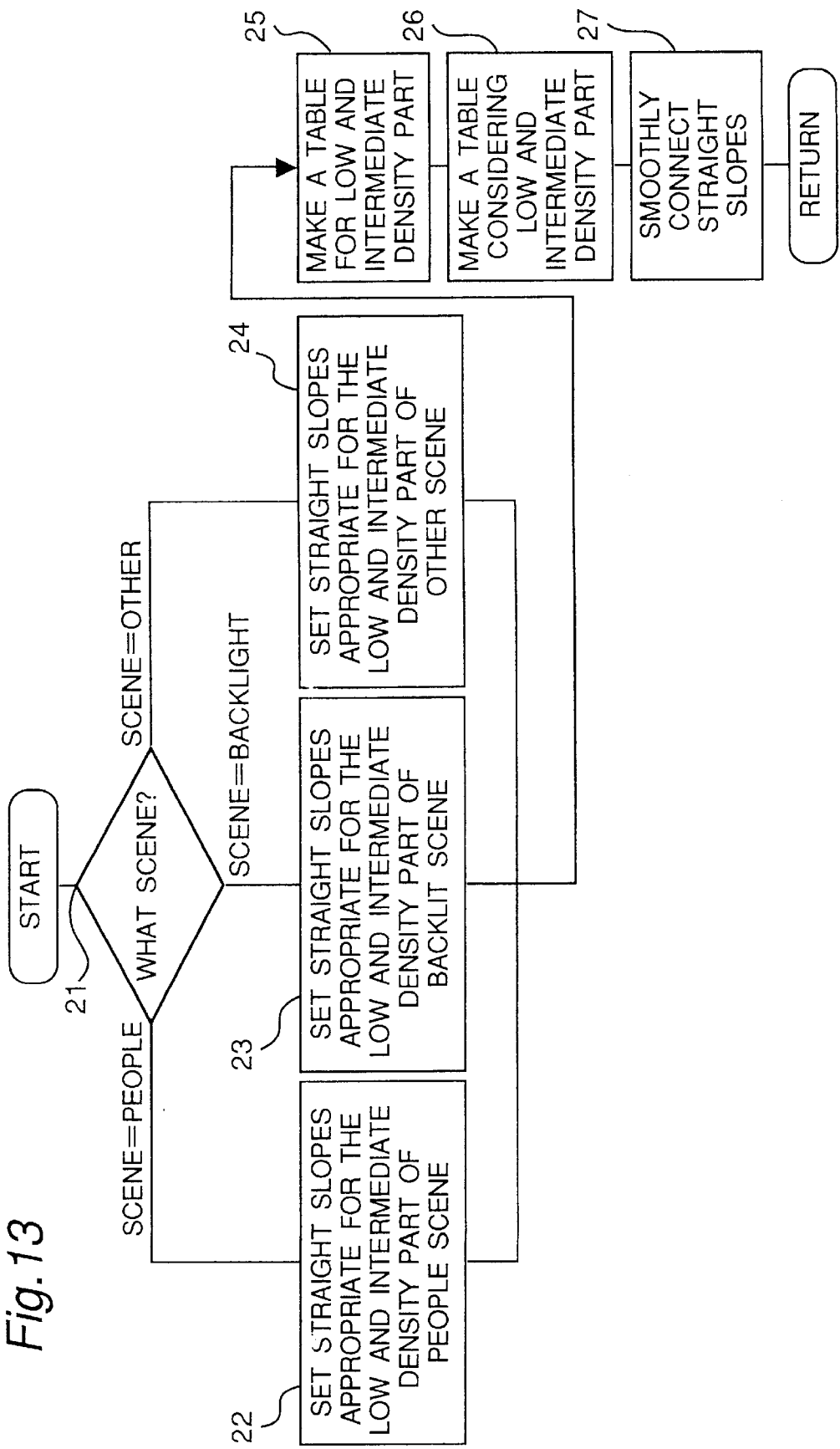
FIG. 13 is a flow chart of the basic density gradation generating means in the first embodiment of the present invention.
Figure 14A:
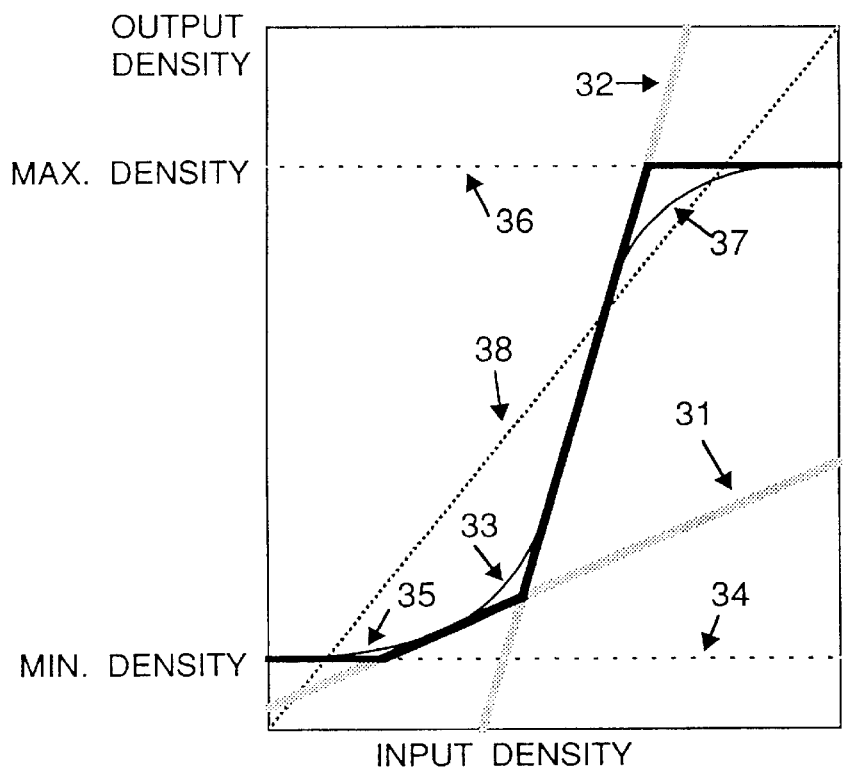
FIG. 14A is a graph of the table of basic density gradation information in the first embodiment of the present invention.
Figure 14B:
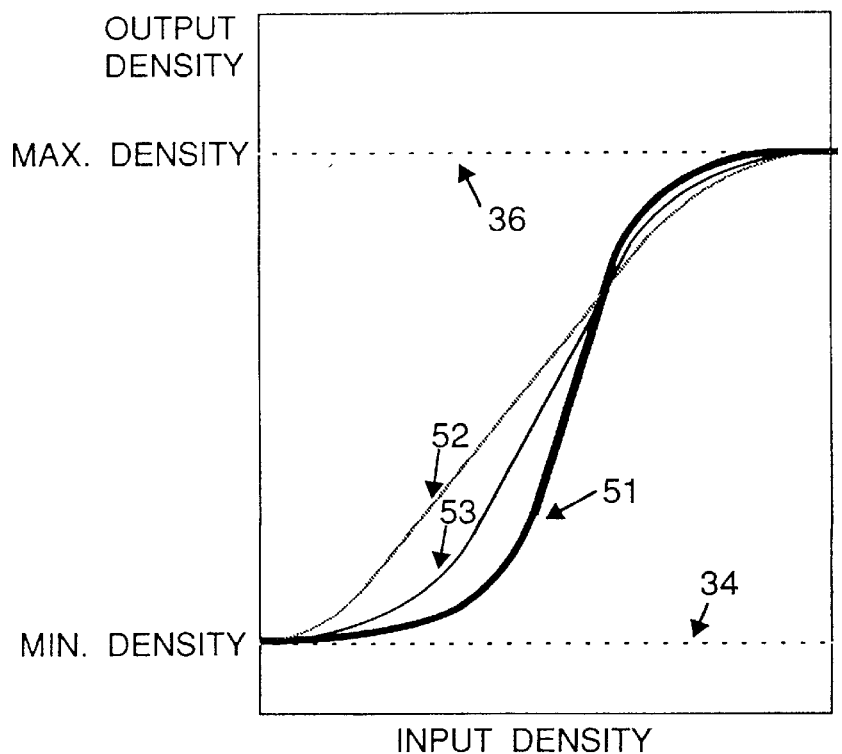
FIG. 14B is a descriptive diagram of the correction table in the first embodiment of the present invention.
Figure 15:
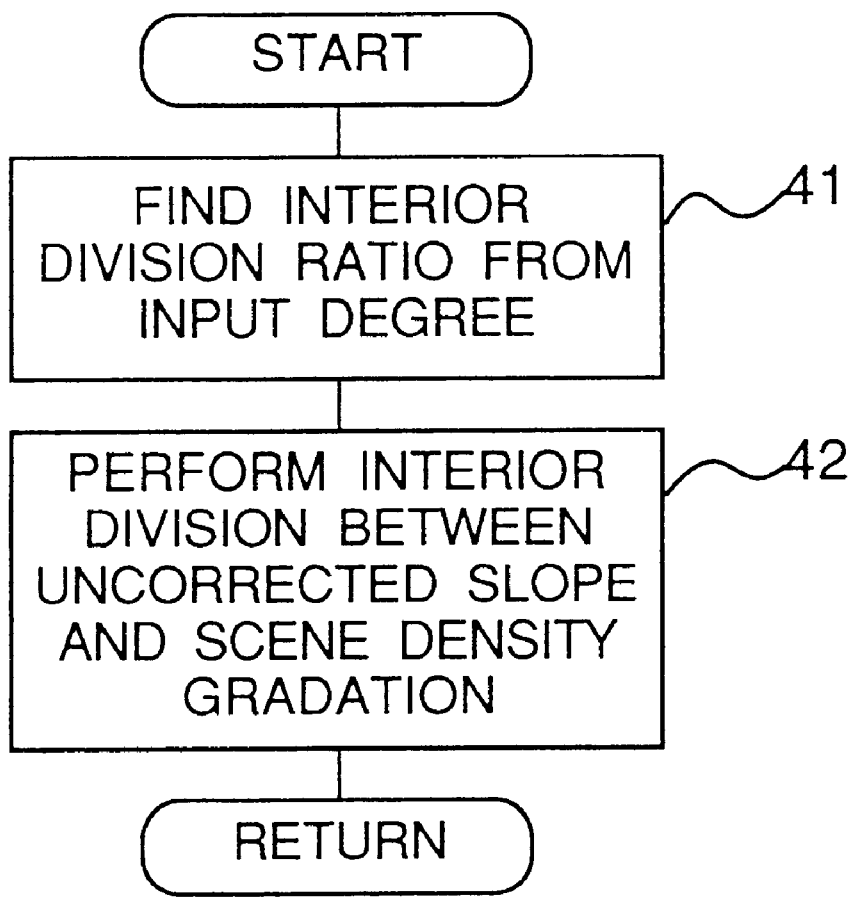
FIG. 15 is a flow chart of the correction means in the first embodiment of the present invention.

The operation of the gradation correction method described above is described below with reference to FIG. 11–FIG. 15. FIG. 12, FIG. 13, and FIG. 15 are flow charts of the processes executed by a microcomputer.

First, in step 10, it is determined to what scene the input image is associated, and the scene information is input. In the present embodiment, whether the input image is associated with a people picture, a backlit picture, or other image is determined by a person, and is input as scene information.

Next, in step 11, the difference between the basic gradation of the scene selected in step 10 and the gradient of the input image is input as a degree. In the present embodiment, the degree information is input as a degree in nine steps, including four steps each on the bright side and the dark side, relative to the image that is the standard for that scene.

Then, in step 12, a basic density gradation correction table optimized for the overall image of which that scene is part is generated based on the scene information input in step 10. Then, in step 13, interior division or exterior division of the basic scene density gradation correction table generated in step 12 and the gradation information when correction is not applied is accomplished based on the degree input in step 11 to obtain the correction density gradation information optimized for the input image.

Next, in step 14, the correction density gradation information obtained in step 13 is converted to luminance information. Then, in step 15, the luminance information of the input image 7 is converted to the luminance information 8 of the gradation corrected output based on the luminance gradation table converted by step 14.

Next, the scene density gradation generating method of step 12 is described in detail with reference to FIG. 13 and FIG. 14.

What scene the input image is associated with is determined in step 21 based on the scene information input in step 10. If that scene is a people picture, the no-change density where the input and output in the low density correction line are equal, the slope of the line, the no-change density where the input and output in the intermediate density correction line are equal, and the slope of the line, needed to generate the density gradation correction information appropriate to people pictures are determined in step 22; and two lines, the correction line (equation A) of the low density part, the slope, and the correction line (equation B) of the intermediate density part, are determined.

$$d_{out}=k1 \cdot (d_{in}-d_{const1})+d_{const1} \quad (A)$$

$$d_{out}=k2 \cdot (d_{in}-d_{const2})+d_{const2} \quad (B)$$

where $d_{in}$ is the input density; $d_{out}$, the output density; k1, the slope of the line determining the low density correction line; $d_{const1}$, the unchanged density where the input and output determining the low density correction line are equal; k2, the slope of the line determining the intermediate density correction line; and $d_{const2}$, the unchanged density where the input and output determining the intermediate density correction line are equal.

Furthermore, if that scene is a backlit picture, two lines of the density input/density output system appropriate to backlit pictures are determined in step 23; and if the scene is neither, two lines of the density input/density output system appropriate to general hard copy output are determined in step 24. In step 25, a table combining the two lines, i.e., the low density line 31 and the intermediate density line 32, in the density plane is generated as shown in FIG. 14A.

Then, in step 26, a table is generated combining the maximum density line 36 indicating the maximum density limiter of the dynamic range of the output system, the minimum density line 34 indicating the minimum density limiter of the dynamic range of the output system, and the line generated in step 25.

Then, in step 27, the connecting members 39 of these lines are connected smoothly as shown by curve 33, curve 35, and curve 37 so that there are no discontinuous parts, thus generating the basic density gradation table (FIG. 16A).

To simply achieve these smooth connections in the present embodiment, the connecting members are smoothly connected using a method of moving averages whereby the average of values in a period of a predetermined width is defined as the output for a given input. This method can be expressed mathematically as shown in equation C.

$$d_n = \frac{\sum_{k=a-w}^{R=W} f(k)}{2W} \tag{C}$$

where dn is the output density, n is the input density, w is the value of ½ the width in which the moving average is obtained, and f(n) is the table generated by step 26.

For the range not covered by the values in the table, the moving average is obtained based on the assumption that the values at the boundary of the range are continuous.

The correction method for scene density gradation in step 13 is described in detail below with reference to FIG. 14A, FIG. 14B, and FIG. 15.

The degree information input in step 11 is converted in step 41 to an interior division ratio or exterior division ratio between the uncorrected information and the scene density gradation information determined in step 12. Then, in step 42, interior division or exterior division is accomplished between the uncorrected table 52 and the scene density gradation table 51 determined in step 12, thus generating the density gradation table 53 modified to suit the input image.

The uncorrected table in the present embodiment is generated from a table combining the line 38 at which the input density and output density are equal, the maximum density line 36, and the minimum density line 34 by executing the same moving averages method applied when generating the basic density gradation table 53.

The specific effects of the present embodiment are described next.

As described with respect to the prior art above, it is necessary to optimize gradation reproducibility using the density in the case of hard copy output because of differences in the visual characteristics of monitors and hard copy. However, this is difficult to achieve using the density only, and knowledge relating to hard copy output is required.

By means of the present embodiment, there is a basic density gradation table of density input/density output information appropriate to the scene, this table is modified based on a degree of brightness to generate a gradation correction table suited to the input image, and gradation correction is accomplished. As a result, gradation reproduction appropriate to the input image can be achieved without knowing about hard copy output by means of an extremely simple method whereby a scene of the input image and the difference between the brightness of the input image and the gradation characteristic that is the basis for each scene are input as a degree of plural steps.

It is also possible by means of the present embodiment to flexibly handle images where there is a difference between the basic scene characteristics and the input image by accomplishing an interior division or exterior division operation between the gradation characteristic that is the basis for the scene and the uncorrected.

Fine optimization of gradation reproducibility can also be accomplished by means of the present embodiment by combining the basic density gradation information and plural lines of different slopes.

Furthermore, by smoothly connecting the break points between the plural lines of different slopes, the present embodiment can achieve by an extremely simple operation methods requiring extremely complex operations such as continuously varying the gamma value in the luminance input/luminance output system, and the continuity of gradation can be maintained.

The present embodiment can also optimize the gradation reproducibility of intermediate tones emphasized particularly in hard copy output, and optimize the gradation reproducibility of the low density region where changes are easily perceived, by means of an extremely simple method, i.e., by determining the basic density gradation information by specifying the unchanged density and slope of the low density correction line defining low density reproducibility and the intermediate density correction line defining intermediate density reproducibility.

A gradation correction apparatus according to the second embodiment of the present invention is described below.

FIG. 17 is a block diagram of a gradation correction apparatus according to the second embodiment of the present invention. As shown 104b is a people degree information determination means for determining the degree of brightness information for people in the input image; 103b is the degree of backlighting information determination means for determining the degree of brightness information of backlighting in the input image; 61 is the other degree information determination means for determining the other degree information in the input image; 63A is a first basic density gradation table comprising the basic density gradation information for density input/density output when the scene is a people picture; 63B is a second basic density gradation table comprising the basic density gradation information for density input/density output when the scene is a backlit picture; 63C is a third basic density gradation table comprising the basic density gradation information for density input/density output when the scene is a picture other than people or backlighting, i.e., is some other picture; 64A is a selection means for selecting the gradation correction information appropriate to the scene of the input image from the output of the respective degree information determination means 63A, 63B, and 63C according to the scene information determined by the scene information determination means 106; 64B is a selection means for selecting the degree of brightness information of a scene in the input image from the respective basic density gradation tables 103b, 104b, and 61; 65 is a table modification means for modifying the selected density gradation table selected by the selection means 64A according to the degree of brightness information selected by the selection means 64B; 66 is a luminance table conversion means for converting the density gradation table modified by the table modification means 65 to a luminance gradation table of luminance input/luminance output (FIG. 16E); and 6 is a gradation correction means comprising the luminance gradation table converted by the luminance table conversion means 66, and outputting the corrected luminance information 8 after correcting the luminance information of the input image 7.

The operation of a gradation correction apparatus thus comprised is described below.

Figure 1:
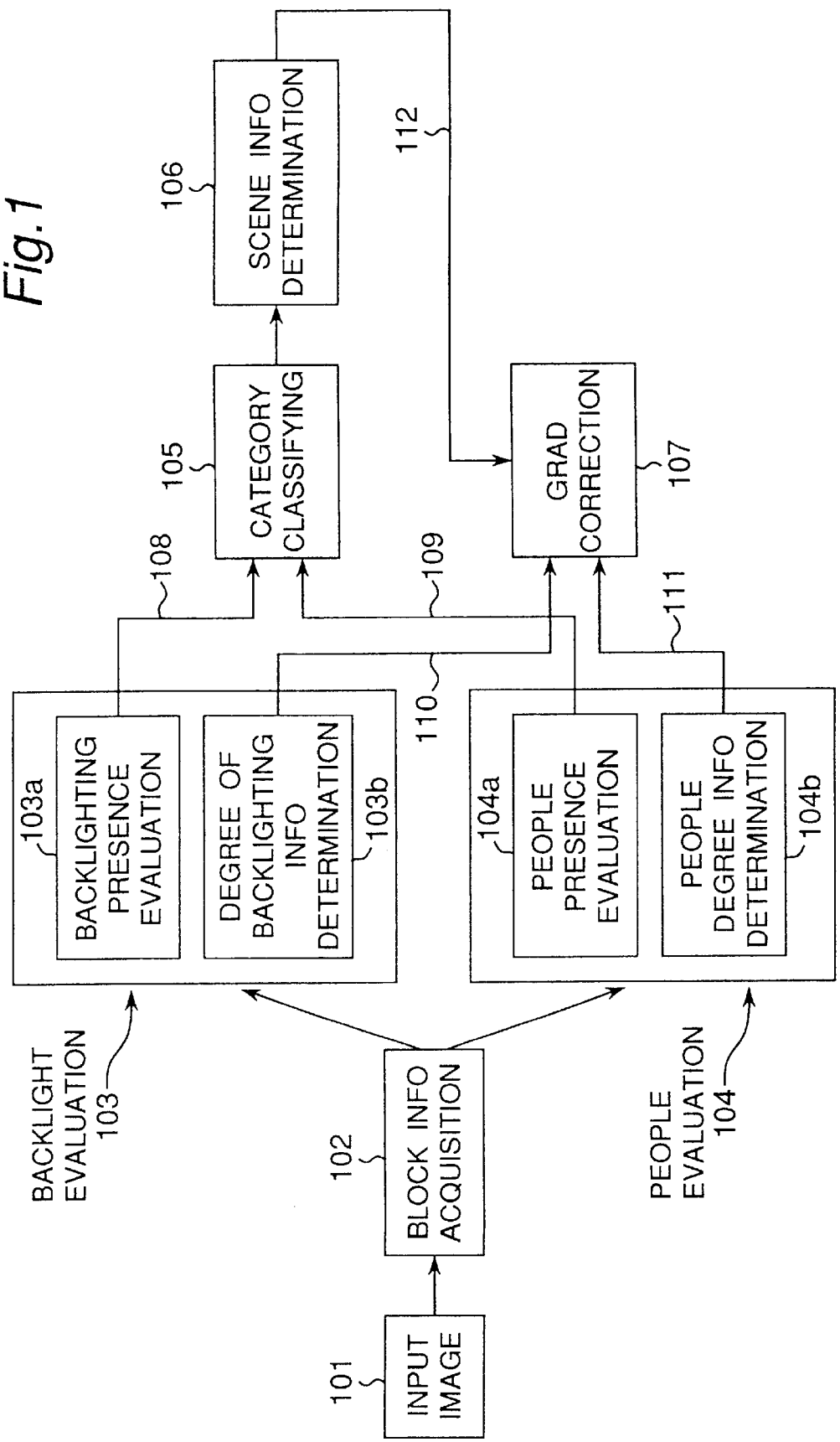
FIG. 1 is a block diagram of a gradation correction apparatus according to the preferred embodiment of the present invention.

The operation for determining the degree of brightness information and the scene information of the image is described in detail first. In FIG. 1, 101 is the input image, and is an image input from a video printer, etc.; 102 is the block information acquisition means 102 for dividing the input image into blocks, determining the representative value of each block, and outputting that representative value as the block information; 103 is the backlighting evaluation means 103 receiving the block information and calculating the backlighting presence evaluation 108 and degree of backlighting 110 by means of backlighting presence evaluation means 103a and degree of backlighting information determination means 103b; 104 is the people evaluation means 104 for calculating the people presence evaluation 109 and people degree 111 by means of people presence evaluation means 104a and people degree information determination means 104b; 105 is a category classifying means for combining the backlighting presence evaluation 108 and people presence evaluation 109 information, and classifying the input image as one of four categories, i.e., first, "a backlit people picture scene," second, "a backlit, non-people picture scene," third, "a non-backlit, people picture scene," and fourth, "a non-backlit, non-people picture scene"; 106 is a scene information determination means for determining from the selected category information the degree of reliability information 112 of the three features of the image scene, i.e., "backlit scene," "people picture scene," and "other," required when synthesizing the correction curve for gradation correction; and 107 is the gradation correction means for generating the gradation correction curve based on the degree of reliability information 112, degree of backlighting 110, and the people degree 111.

Of the various blocks thus constituted, the block information acquisition means 102 is described below. The input image 101 input to the block information acquisition means 102 is a full-color image of an analog signal from a video printer, etc., in which each A/D converted pixel is expressed by luminance Y and color differences RY and BY where RY=R−Y, and BY=B−Y. Because the amount of data processed increases if this image is used as is for backlighting evaluation and people evaluation, the block information acquisition means 102 divides the screen vertically and horizontally into blocks, and uses only the representative value of each block as the block information for evaluation. The block information comprises three types of information, (1) the average value (the average value of the colors in each block), (2) the WP value (the color of the pixel (place) where luminance Y is highest in each block), and (3) the BP value (the color of the pixel (place) where luminance Y is lowest in each block), each of which is expressed by luminance Y and color differences RY and BY. This information can be said to contain both the gradation information and the color distribution information in the block. For example, when one block is a "solid color" such as a painted wall, these three information types all match even when the color is skin color. With rough surface objects such as a person's face, however, there will be shadows in the block, in general the three types of skin color will differ, WP will be essentially highlights, and BP will be essentially black. Thus, the block information will have a certain amount of gradation information although the resolution information will drop.

Furthermore, while not described in the present embodiment, this block information is already achieved in white balance correction processes removing the effects of lighting on the subject, and AGC (auto-gain control), which is a standard luminance correction method.

Figure 2:
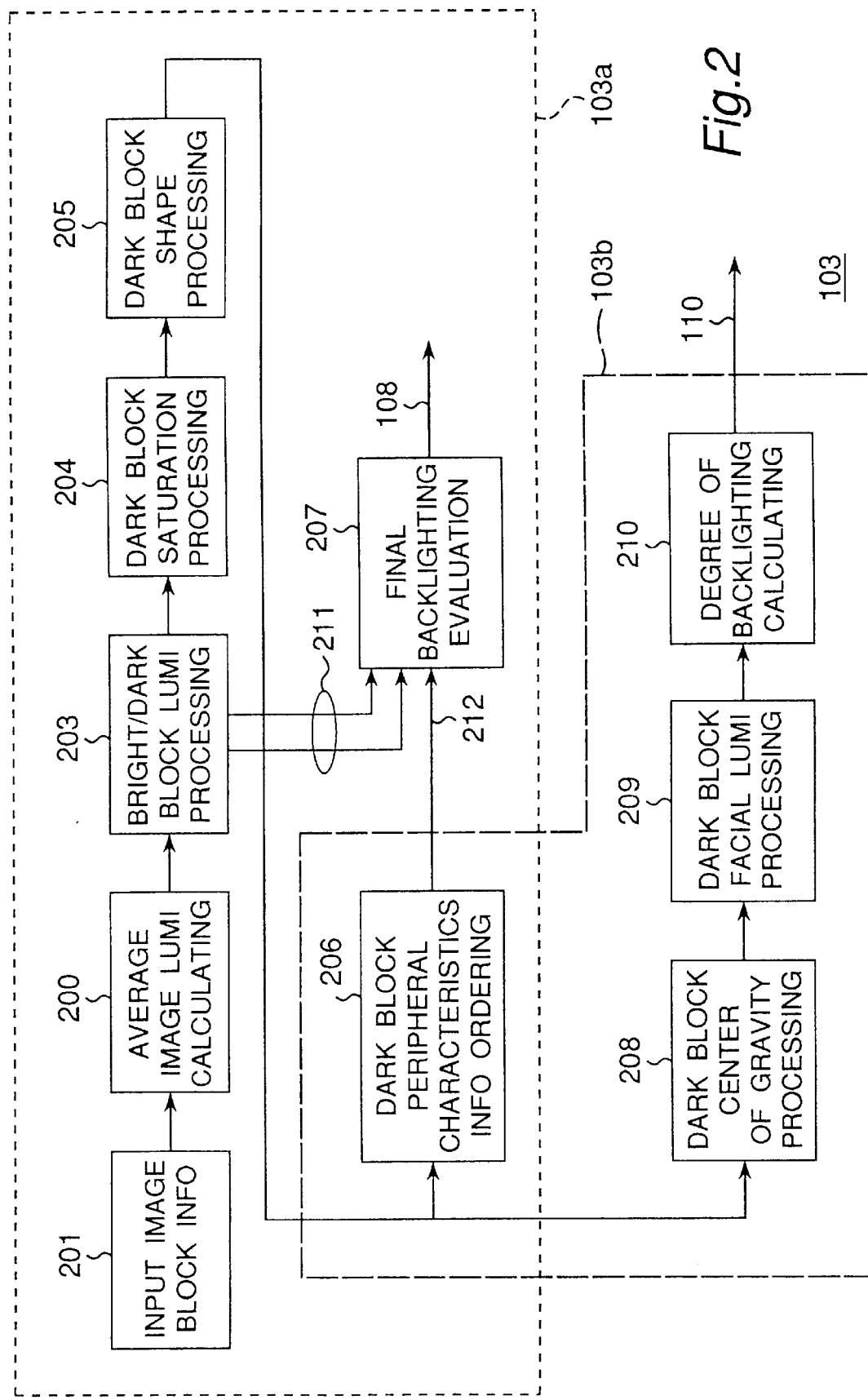
FIG. 2 is a block diagram showing the backlighting evaluation means that is a major component of the gradation correction apparatus of the preferred embodiment.

The backlighting evaluation means 103 is described in detail next with reference to FIG. 2. FIG. 2 is a block diagram of the backlighting evaluation means 103, which is a major component of the gradation correction apparatus according to a preferred embodiment of the present invention. The backlit picture evaluation guidelines are described first.

The present embodiment assumes that "the difference between a backlit picture and a normal lighting picture is in the distribution pattern of the shadows in the image." In a normal lighting picture, shadow blocks are present randomly in the image rather than concentrated in a single area when the image is expressed as a block average image because lighting is projected from the front of the subject. In a backlit picture, lighting is projected from above or behind the subject, and the shadow blocks are present as a block at the bottom of the picture, or are present from the top to the bottom of the picture. Backlighting is therefore evaluated using two parameters, luminance and the grouping pattern (luminance and shape), of the shadow blocks. When there are two people in a backlit situation, the center of the image may be bright, and this method therefore does not assume that the shadows are in the image center. Following this guideline, the blocks that are shadows (dark) are evaluated by applying a luminance threshold value process using primarily the average luminance of the block information. Then backlighting is evaluated considering all of three conditions: the average luminance of dark areas, the bright area:dark area luminance ratio, and the shape of dark areas.

In FIG. 2, the input image block information 201 is an image created from the average block colors from the three types of block information; the average luminance and the average chromaticity of each block are calculated. The average image luminance calculating means 202 obtains the average value of the average luminance of all blocks; and the image is digitized by the bright/dark block luminance processing means 203, separating the image into two types of blocks, dark and bright. An example of the above process is shown in FIG. 3.

Figure 3A:
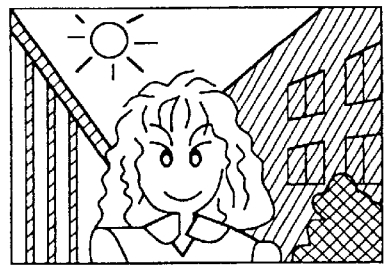
FIG. 3 is a conceptual diagram showing the bright/dark block luminance process in the gradation correction apparatus of the preferred embodiment.
Figure 3B:
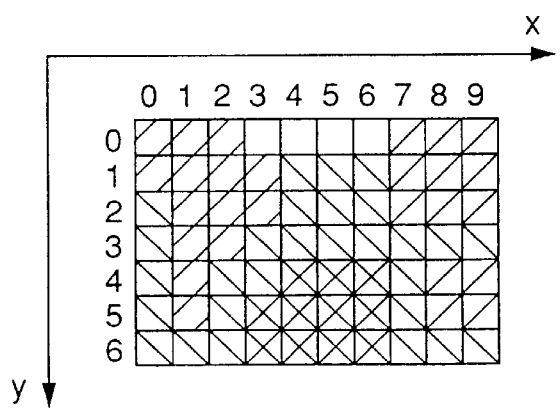
Figure 3C:
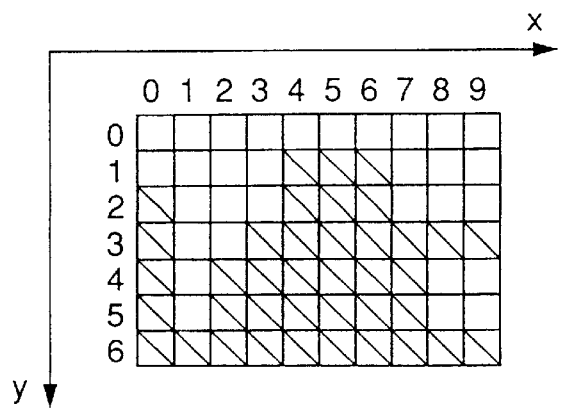

FIG. 3(a) is the input color image, in this case a bust shot of a backlit person. FIG. 3(b) shows the average luminance image of the average block color images obtained by dividing the image into a total of 70 blocks, 7 blocks vertically (x direction) and 10 blocks horizontally (y direction); when this is digitized using the overall average of the luminance of each block, FIG. 3(c) is obtained. The shape of the backlit part of the person is substantially equivalent to the dark areas.

If the average block luminance image and the digitized image are expressed as the two-dimensional arrays AV__YY [x][y] and dark__tbl[x][y], respectively, the average luminance of all blocks, average mean__y, is $$\text{mean\_y} = \frac{1}{70} \sum_{x=0}^{9} \sum_{y=0}^{6} AV\_YY[x][y] \quad (1)$$

and the digitized image is created by applying in bright areas, if $AV_{13} YY[x][y] > \text{mean\_y}$
then dark__tbl[x][y]=0, and in dark areas, if $AV\_YY[x][y] < \text{mean\_y}$
then dark__tbl[x][y]=1.

Then, in the bright/dark block luminance processing means 203, (1) the average dark area luminance dark__mean, (2) the average bright area luminance light__mean, and the (3) bright:dark luminance ratio LDratio, are similarly calculated. where dark__large is the total number of dark blocks.

$$\text{dark\_mean} = \frac{1}{\text{dark\_large}} \sum_{x=0}^{9} \sum_{y=0}^{6} AV\_YY[x][y] \qquad (2)$$

(for $x, y$:dark_tbl[$x$][$y$] == 1)

$$\text{light\_mean} = \frac{1}{70 - \text{dark\_large}} \sum_{x=0}^{9} \sum_{y=0}^{6} AV\_YY[x][y] \qquad (3)$$

(for $x, y$:dark_tbl[$x$][$y$] == 1)

$$LD\_\text{ratio} = \frac{\text{light\_mean}}{\text{dark\_mean}} \qquad (4)$$

The dark block saturation processing means 204 is introduced to resolve the problem that, when a backlit person is photographed, the dark areas of the digitized image are formed with the relatively high saturation and luminance background (green mountains, green trees, etc.) connected to the subject, i.e., backlit people, in the foreground. The process redigitizes using the average saturation only the dark areas of the digitized image, and leaves as the digitized image only the dark, low saturation monochrome regions. However, redigitization using saturation processing is not effective for all images, and has the opposite effect in the backlit regions of low saturation monochrome images because monochrome areas that are all essentially the same are redigitized using only a slight saturation change. Furthermore, in backlit pictures of people wearing high saturation, low luminance clothing, only the face is separated and the typical backlighting pattern is destroyed because the clothing is not imaged as a backlit region.

As a result, the average saturation in the dark areas is first obtained, and redigitization is not applied when that average saturation is extremely low or extremely high. The specific process is as described below.

(1) Obtain the average saturation square (dark_mean_s) in the dark areas.

$$\text{dark\_mean\_}s = \qquad (5)$$

$$\frac{1}{\text{dark\_large}} \times \sum_{x=0}^{9} \sum_{y=0}^{6} (AV\_RY[x][y])^2 \times (AV\_BY[x][y])^2$$

(for $x, y$: dark_tbl[$x$][$y$] == 1)

(2) If the value of dark_mean_s is greater than threshold value S1 (S_CHECK=1), saturation is sufficiently high: do not digitize.

(3) If the value of dark_mean_s is less than threshold value S2 (S_CHECK=2), saturation is sufficiently low: do not digitize.

(4) If the value of dark_mean_s is between S1 and S2 (S_CHECK=0), digitize.

Digitization is executed as:

if $(AV\_RY[x][y])2 \times (AV\_BY[x][y])2 < \text{dark\_mean\_}s$ then dark_*tbl*[$x$][$y$]=0.

The dark block shape processing means 205 calculates the four peripheral characteristics of the dark areas. As described above, backlit subjects have a shape characteristic occurring on the screen as a group of shadows from the bottom to the top of the screen. Therefore, the image is digitized, and the number of continuous black blocks from each of the four sides, top, bottom, left, and right, until the black blocks first disappear, are added for each side to obtain the four peripheral characteristics. The shape and position of the dark area group in the image can then be expressed by ordering the values of the peripheral characteristics from first to fourth. The processing method is described with reference to FIG. 4.

Figure 4:
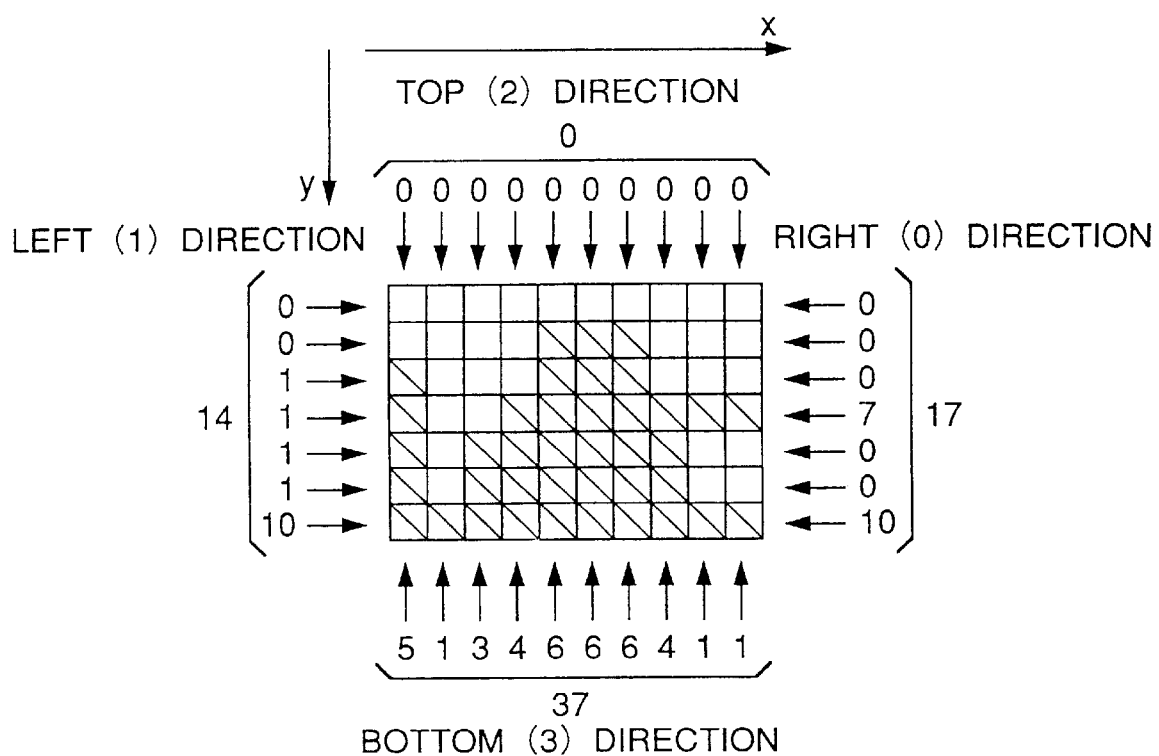
FIG. 4 is a conceptual diagram showing an example of the bright/dark block shape process in the gradation correction apparatus of the preferred embodiment.

FIG. 4 is a conceptual diagram of an embodiment of the dark block shape process. In FIG. 4, the image is divided into 10 blocks in the x direction and 7 blocks in the y direction where the top left is the home position and the x axis is horizontal and the y axis is vertical. The direction from the right side of the image is direction (0), direction (1) from the left side, direction (2) from the top side, and direction (3) from the bottom side. The peripheral characteristics are quantities obtained by accumulating the number of continuous black blocks in the opposite direction from each of these four directions, and adding the accumulated sums at each side. These quantities are accumulated as periph[0] to periph[3].

$$\text{periph}\ [0] = \sum_{y=0}^{6} S0(y) \qquad (6)$$

Figure 5:
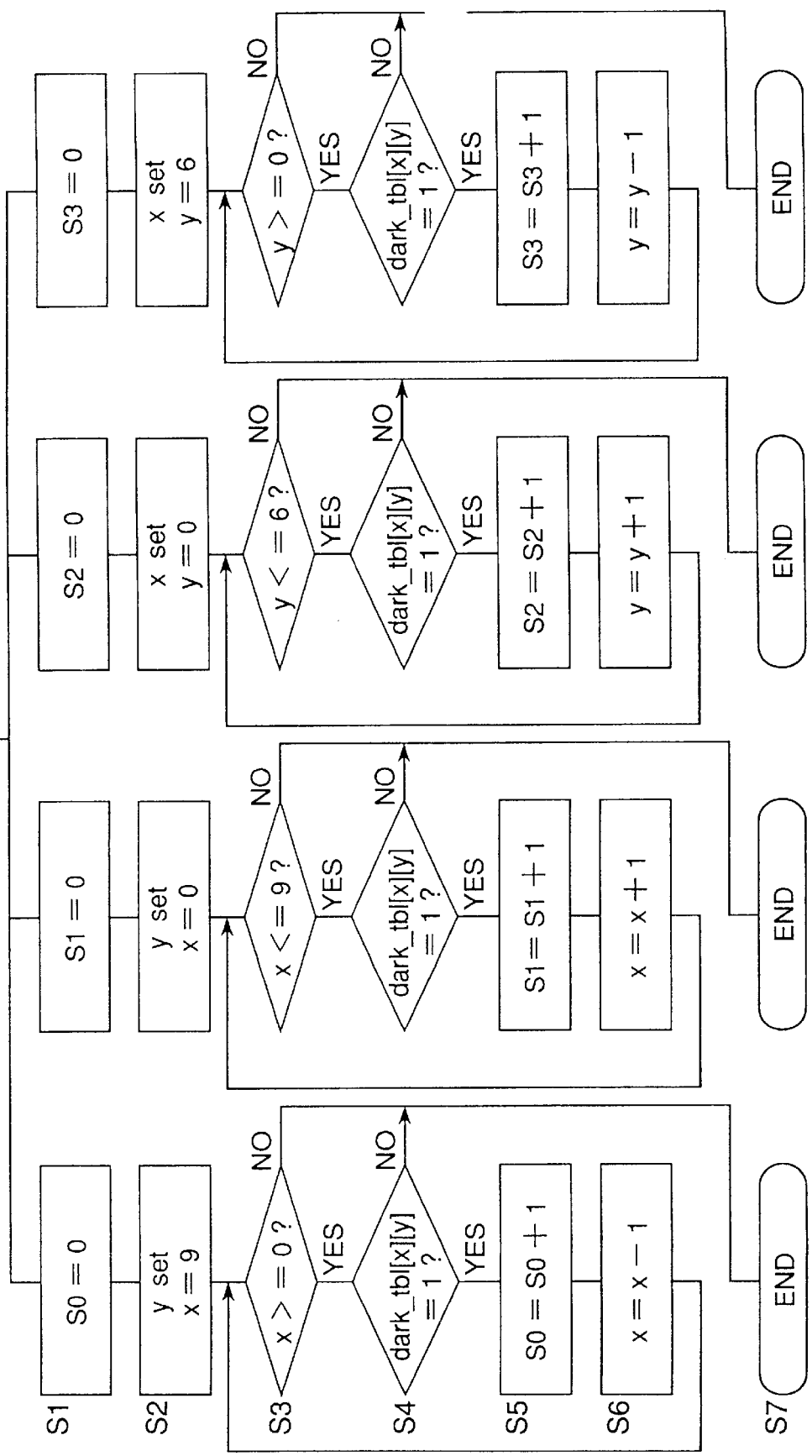
FIG. 5 is a flow chart of the bright/dark block shape process in the gradation correction apparatus of the preferred embodiment.

The method of obtaining S0, S1, S2, and S3 is $$\text{periph}\ [1] = \sum_{y=0}^{6} S1(y) \qquad (7)$$

$$\text{periph}\ [2] = \sum_{x=0}^{9} S2(x) \qquad (8)$$

$$\text{periph}\ [3] = \sum_{x=0}^{9} S3(x) \qquad (9)$$

described with reference to FIG. 5. FIG. 5 is a flow chart of the dark block shape process. Because S0–S3 are obtained by means of the same process, only S0 is described assuming y=0. Referring to FIG. 5, S0=0, y=0, and x=9 are first set (steps (S1) and (S2) in FIG. 5), and if x is not 0, it is determined whether dark_tbl[x][y]=1 (steps (S3) and (S4)). If dark_tbl[x][y]=0, the process ends. If dark_tbl[x][y]=1, S0 is incremented by 1 (step (S5)), x is decreased 1 (step (S6)), and it is again determined whether x is greater than or equal to 0 or not. If x=0, the process ends (step (S7)).

This process is executed from y=0 to y=6, and the sum is obtained. For the example shown in FIG. 4, the following dark block peripheral characteristics are obtained.

periph[0]=17
periph[1]=14
periph[2]=0
periph[3]=37

The dark block peripheral characteristics information ordering means 206 orders the dark peripheral characteristics periph[0] to periph[3] according to relative magnitude, and sets the directions 0, 1, 2, 3 in order from order[0] to order[3]. In the example shown in FIG. 4, the peripheral characteristics are, in largest to smallest order, 37, 17, 14, and 0, and the directions set in order are:

order[0]=3 (bottom direction)
order[1]=0 (right direction)
order[2]=1 (left direction)
order[3]=2 (top direction).

This relationship can be expressed with the simplified expression (3012) of the pattern shape information for the four directions assuming a largest to smallest order. This pattern information 212 expresses the position and shape information that "dark areas are present from the bottom to the right side of the image, and are not present at the top."

The final backlighting evaluation means 207 obtains two pieces of information 211, i.e., the average dark area luminance dark_mean and the bright:dark luminance ratio LDratio, from the bright/dark block luminance processing means 203, and obtains the dark area pattern information 212 from the dark block peripheral characteristics information ordering means 206.

Then, the final backlighting evaluation means 207 evaluates the presence of backlighting based on the three conditions:

(1) the average dark area luminance is darker than the bright/dark threshold value dark_mean_t (dark_mean<= dark_mean_t)

(2) the bright:dark luminance ratio is greater than the luminance ratio threshold value LD_t (LDratio>=LD_t)

(3) the shape pattern of the dark areas is (3xxx) or (23xx). If all three conditions are simultaneously satisfied, the scene is determined to "be backlit"; if any one of the conditions is not satisfied, the scene is determined to "not be backlit." The value of "x" here is any value. In other words, the scene is determined to be backlit when the dark area is a pattern in which direction 3 (bottom) is the largest, or when 2 (top) and then 3 (bottom) are greatest. This former case corresponds to the most typical case, backlit bust shots of a person, and the latter to backlit close-ups of a person's face. This evaluation becomes the backlighting presence evaluation 108.

The center of gravity of the dark area is then obtained. What must be considered in the process obtaining the center of gravity is that foreground dark areas other than the subject often intrude on the right and left edges of the image in backlit scenes, and as a result the overall center of gravity of the dark area may be significantly offset to the right or left. To prevent this, one block at the right and left edges of the image at x=0 and x=9 is not used in the calculation, and the center of gravity calculation is accomplished using the blocks in the x direction from 1 to 8. If the center of gravity position in block coordinates (x,y) is (gcenterX, gcenterY), then $$gcenterX = \frac{1}{dark\_large}\sum_{x=1}^{8}\sum_{y=0}^{6}x \qquad (10)$$

(for $x, y$: dark_tbl[$x$][$y$] = 1)

It is then determined whether the center of gravity used for inferring the position of the face of a human subject during the degree of backlighting calculation is inside or outside of the dark area. When the center of gravity is inside the dark area, the distribution of the dark area is concentrated, and the backlit subject can be inferred to be present in a mountain-like shape at the image center. However, if the center of gravity is outside the dark area, the backlit subject can be inferred to be two people suggesting a twin-peak mountain-like shape. When the block of the center of gravity position is expressed as shown in FIG. 8, this information can be case-dependently expressed as G . . . when the center of gravity is inside the dark area, g . . . when the center of gravity is outside the dark area.

The dark block facial luminance processing means 209 calculates the degree of backlighting. At first it was thought that the average luminance of the dark area could simply become an indicator of degree, but in practice there are cases where, even though the face is dark, the average luminance is high because of white clothing, and the evaluation did not agree with subjective evaluation. It was therefore determined to use the luminance of the person's face as the index in an attempt to equal subjective evaluation by a person. While a search for skin color is often used to search for the face, people's faces under backlit conditions are shadowed and essentially void of color information, and searches using color are impossible. However, because a characteristic of backlit images is that a person is in the backlit area, it is sufficient to infer the facial position only inside the dark area based on the center of gravity position of the dark area. The shape of the dark area is then classified as one of the three following cases considering the results of the dark block peripheral information ordering process, the position of the person's face in each of these cases is inferred, and the average luminance facelight calculated. The method of calculating facelight is described below using FIG. 6, a conceptual illustration of facial inference from the dark blocks. In FIG. 6 the dark areas indicate the dark blocks, and the hatched area indicates the area inside the dark blocks inferred to be the face of a person, and face_num is the number of blocks determined to be the facial part of a person.

Figure 6A:
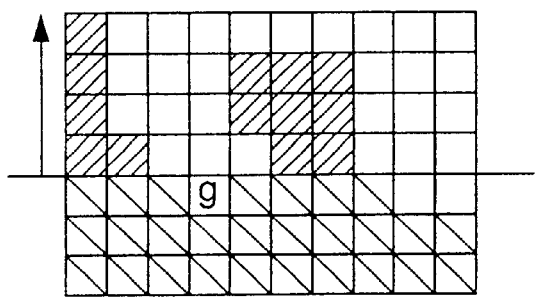
FIG. 6 is a flow chart of a bright/dark block human face inference example in the gradation correction apparatus of the preferred embodiment.

The case in which the center of gravity of the dark area is outside the dark area is described first with reference to FIG. 6(a). The center of gravity block g is in the valley area outside the dark areas because the dark areas suggest a twin peak shape, and it is therefore concluded that there are two or more people in a backlit condition. At this time the average luminance is obtained based on the assumption that "the entire dark area above the center of gravity position" represents the faces of two people.

$$facelight = \frac{1}{face\_num} \times \sum_{y=0}^{9}\sum_{y=0}^{gcenterY-1} AV\_YY[x][y] \qquad (12)$$

(for $x, y$: dark_tbl[$x$][$y$] = 1)

Figure 6B:
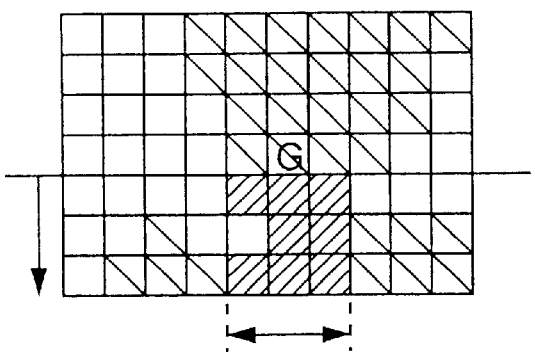

The case in which the center of gravity of the dark area is inside the dark area and the dark area shape is (23xx) (where x is any value) is described second with reference to FIG. 6(b). This is a case in which the dark area is present from the top of the image to the bottom, and corresponds to a close-up of a backlit person or the presence of forest or other distant scenery in the background above a backlit person. If the top of the dark area is assumed to be the face at this time, a slightly high luminance may also be obtained in the distant scenery part of the image, and the average luminance is therefore obtained assuming that "the dark area below the center of gravity position and inside the three block rectangular area to the right and left of the center of gravity" is the face of a person.

$$facelight = \frac{1}{face\_num} \times \sum_{x=gcenterX-1}^{gcenterX+1}\sum_{y=gcenterY+1}^{6} AV\_YY[x][y]$$

(for $x, y$: dark_tbl[$x$][$y$] = 1)

Figure 6C:
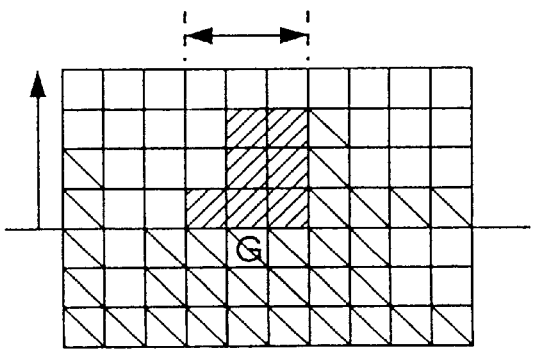

The case in which the center of gravity of the dark area is inside the dark area and the dark area shape is (3xxx) is described third with reference to FIG. 6(c). This is a case in which the dark area is present at the bottom of the image, and is the standard case encountered in bust shots of a backlit person. In this case there is a strong possibility that the "clothing" of the person is present in the area below the dark area, and the average luminance is greatly affected by whether the color of the clothing is black or white. To avoid this, the average luminance is obtained assuming that "the dark area above the center of gravity position and inside the three block rectangular area to the right and left of the center of gravity" is the face of a person.

$$\text{facelight} = \frac{1}{\text{face\_num}} \times \sum_{x=\text{gcenter}X-1}^{\text{gcenter}X+1} \sum_{y=0}^{\text{gcenter}Y-1} AV\_YY[x][y]$$

(for $x, y$: dark_tbl[$x$][$y$] = 1)

There are also cases in which there is not even one dark block in the candidate face region determined from the dark area center of gravity (face_num=0). For example, this is the case in which (1) the center of gravity is outside the dark area, and the number of candidate face blocks=0, or (2) the center of gravity is inside the dark area, and the shape pattern is other than 2xxx or 3xxx.

In this case, the average luminance of the face is set to the maximum 255. The degree of backlighting calculating means 210 expresses the degree of backlighting by comparing the face area luminance with the bright/dark threshold value dark_mean_t, and expressing the amount of darkness as an evaluation value or 0–255. The face luminance most_dark is defined as the maximum degree of backlighting 255 for normalization. More specifically, $$\text{degree of backlight (gyakkodo)} = \frac{[(\text{dark\_mean\_}t) - (\text{facelight})]}{[(\text{dark\_mean\_}t) - (\text{most\_dark})]} \times 255 \quad (15)$$

when the facelight is 255 and the degree of backlighting is negative, the degree of backlighting is 0. This becomes the degree of backlighting 110.

Figure 7:
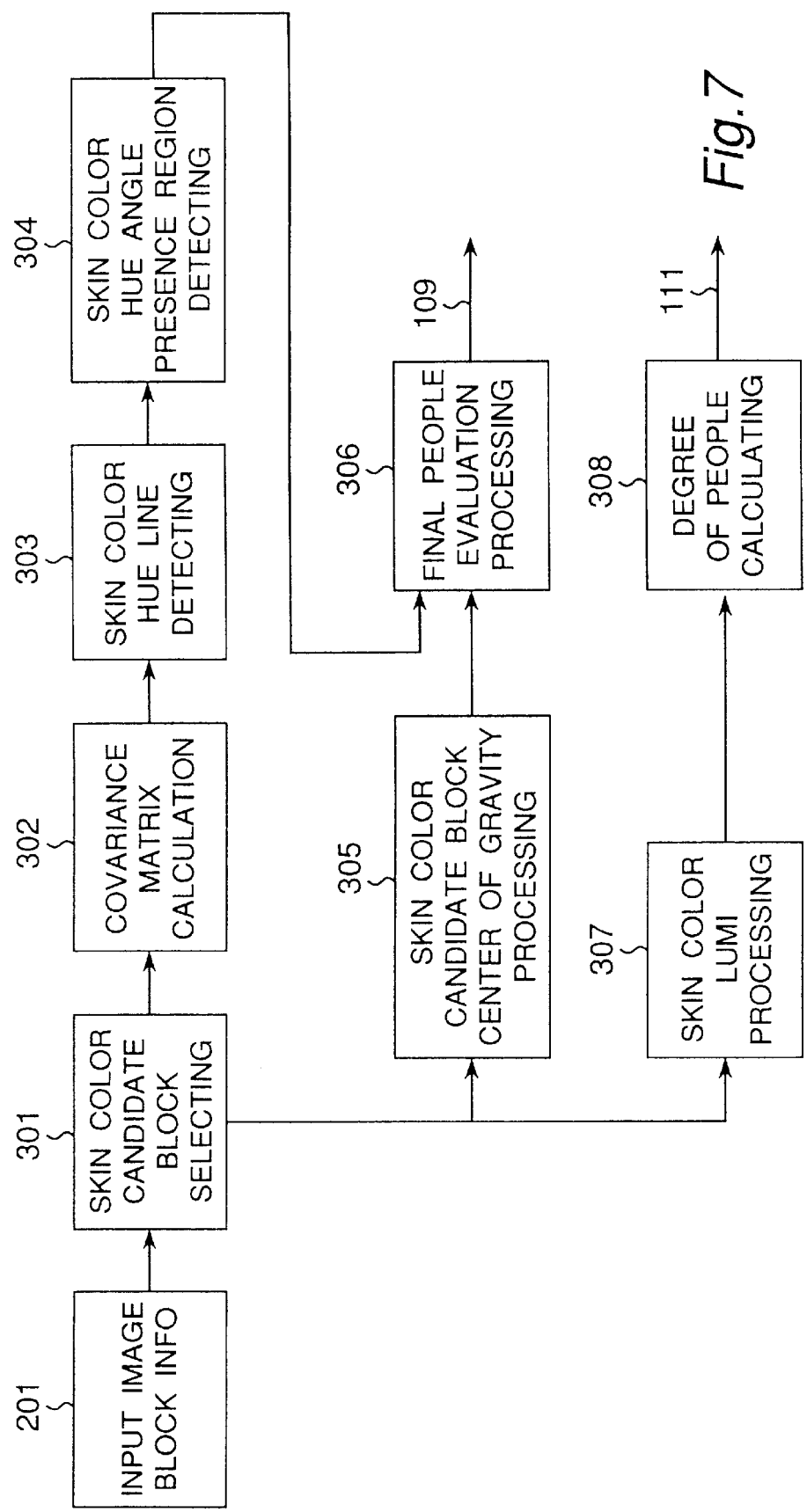
FIG. 7 is a block diagram showing the people evaluation means that is a major component of the gradation correction apparatus of the preferred embodiment.

The people evaluation means 104 is described in detail next with reference to FIG. 7. FIG. 7 is a block diagram of the people evaluation means 104, which is a major component of the gradation correction apparatus of the preferred embodiment of the present invention. The guidelines for evaluating people pictures is described first.

While detecting skin color in the face is used for detecting people as in the prior art, the features of the gradation information are also extremely important, not only the chromaticity of the face color. The skin color in people's faces also contains bright shadows, while the nose, cheeks, and forehead are a nearly-white skin color, and the hair, eyes, and such openings as the nose holes and mouth are nearly black. This means that in the block information the nearly-white area in each block is detected as the WP value, the nearly-black areas as the BP value, and the overall skin color can be detected as the average value. If these are plotted on a chromaticity diagram, there is a tendency for the gradation highlights, average, and dark areas to form the same the same hue line in a skin color image because low saturation whites and blacks and high saturation skin color are present. A wall that is a cream color with the same hue, however, is a uniform color with substantially no shadows, and a clear hue line is therefore not formed on the chromaticity diagram. Furthermore, with red colors of the same hue as skin color, the saturation of the dark area is high, and can be clearly distinguished. Considering the above, the WP value, BP value, and average value of each block in the image are all plotted on the chromaticity diagram in the present invention, and the hue line is extracted using a principal component analysis method to detect the resemblance to skin color. The present invention therefore calculates the angle of the overall data distribution substantially correctly even when the hue lines move parallel without passing through the home position due to the effects of the illumination light by detecting the resemblance to skin color in two steps, (1) detecting the hue line by principal component analysis using only sampling data present in the second quadrant of a simple chromaticity diagram, and (2) detecting whether the angle of the detected hue line is in the range of $\pi/4$ to $\pi$ in the simple chromaticity diagram.

In FIG. 7, the skin color candidate block selecting means 301 processes the input image block information 201, and selects the block information present in the skin color-like hue angle. If this candidate block selection is not accomplished, statistical processing will also cover colors with absolutely no relationship to skin color, and meaningful results will not be obtained. Therefore, it is assumed that "skin colors are present in the range from yellow hues to red hues in the RGB color space even when affected by variable lighting," and a simple color difference (R–G) (B–G) chromaticity diagram (color moment diagram) is used as the chromaticity diagram. With the simple color difference chromaticity diagram, evaluating the candidate blocks can be accomplished with a simple positive/negative evaluation because hues from yellow to red in the hues defined in the RGB color space correspond to the second quadrant of the simple color difference chromaticity diagram, which thus offers the advantage of not requiring an angle calculation. Therefore, in the following description, RY means R–G, and BY means B–G. Hue line 901 is shown expressed in the simple color difference chromaticity diagram in FIG. 8(A). As shown in this example, skin color recorded outdoors is often present in the second quadrant from yellow to red in the simple chromaticity diagram.

Figure 8B:
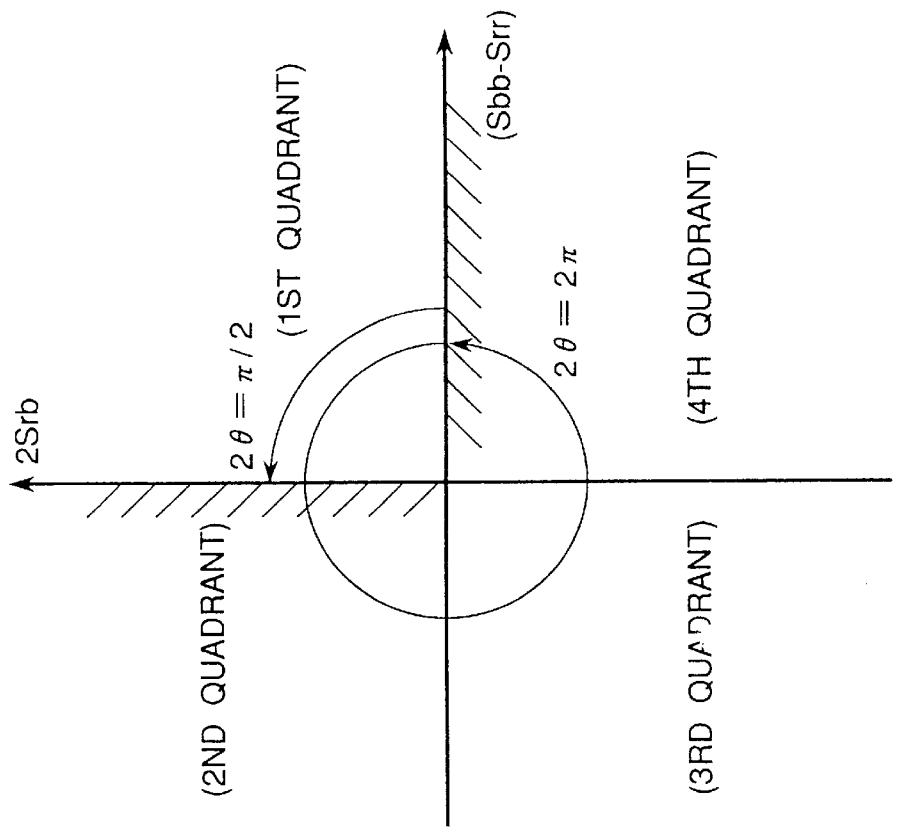
FIG. 8B is a conceptual diagram showing the presence range of skin color hue angle $2\theta$ in the gradation correction apparatus of the preferred embodiment.
Figure 8A:
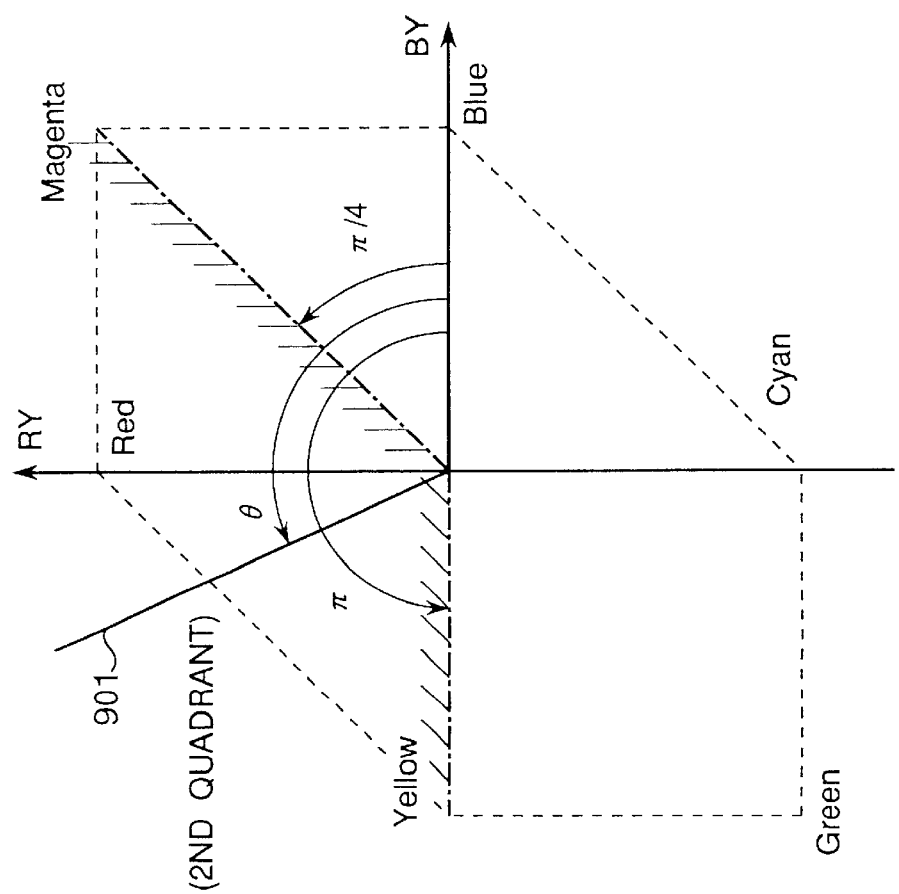
FIG. 8A is a simple color difference chromaticity diagram showing the range of angle $\theta$ of the skin color hue curve in the gradation correction apparatus of the preferred embodiment.

Thus, candidate block selection uses the concept that only the WP value and average are both in the second quadrant of the simple chromaticity diagram in FIG. 8(A), and places no conditions on the BP value. If the block information normally expressed as (Y, RY=R–Y, BY=B–Y) is converted to simple color difference values (Y, R–G, B–G), and the values (1) average $AV_{13}$ YY[x][y], AV_RY[x][y], AV_BY[x][y]

(2) WP value WP_YY[x][y], WP_RY[x][y], WP_BY[x][y]

(3) BP value BP_YY[x][y], BP_RY[x][y], BP_BY[x][y]

are re-expressed, only the blocks present in the second quadrant of the simple color difference chromaticity diagram shown in FIG. 8(A) are candidates; therefore, using candidate block table Zin_tbl[x][y], if (
      WP_RY[x][y]>=0, and WP_BY[x][y]<=0
      AV_YY[x][y]>=0, and AV_BY[x][y]<=0
    ) then
      Zin_tbl[x][y]=1
    else
      Zin_tbl[x][y]=0.

That the saturation of the WP value is not extremely great is added as another condition:

if (
      WP_RY[x][y]<sikido_max and
      WP_BY[x][y]<sikido_max

) then
    Zin_tbl[x][y]=1
else
    Zin_tbl[x][y]=0.

The number of skin color candidate blocks detected as Zin_tbl[x][y]=1 is hada_num.

Covariance matrix calculation means 302 obtains the statistics of color distribution using three types of block information, the WP value, BP value, and average value inside the skin color candidate blocks, and using the gradation information of these blocks. The statistic method uses a principal component analysis method obtaining the first proper vector from the covariance matrix, and therefore calculates the overall average, variance, and covariance of each WP, BP, and average color in the skin color candidate blocks.

The averages of RY and BY, ry_av and by_av, are obtained by the following equation. However, the sum is obtained for all x and y where Zin_tbl[x][y]=1.

$$ry\_av = \frac{\sum_{x,y} WP\_RY[x][y] + \sum_{x,Y} BP\_RY[x][y] + \sum_{x,y} AV\_RY[x][y]}{3 \times hada\_num} \quad (16)$$

$$by\_av = \frac{\sum_{x,y} WP\_BY[x][y] + \sum_{x,Y} BP\_BY[x][y] + \sum_{x,y} AV\_BY[x][y]}{3 \times hada\_num} \quad (17)$$

where hada_num is the number of skin color candidate blocks, and 3×hada_num is the total number of color samples. The variance Srr and Sbb of RY and BY, and the covariance Srb, are obtained by the following equations.

Similarly, the sum is obtained for all x and y where Zin_tbl[x][y]=1.

$$Srr = \sum_{x,y}(WP\_RY[x][y] - ry\_av)^2 + \quad (18)$$
$$\sum_{x,y}(BP\_RY[x][y] - ry\_av)^2 +$$
$$\sum_{x,y}(AV\_RY[x][y] - ry\_av)^2$$

$$Sbb = \sum_{x,y}(WP\_BY[x][y] - by\_av)^2 + \quad (19)$$
$$\sum_{x,y}(BP\_BY[x][y] - by\_av)^2 +$$
$$\sum_{x,y}(AV\_BY[x][y] - by\_av)^2$$

$$Srb = \sum_{x,y}(WP\_RY[x][y] - ry\_av) \times (WP\_BY[x][y] - by\_av) + \quad (20)$$
$$\sum_{x,y}(BP\_RY[x][y] - ry\_av) \times (BP\_BY[x][y] - by\_av) +$$
$$\sum_{x,y}(AV\_RY[x][y] - ry\_av) \times (AV\_BY[x][y] - by\_av)$$

As a result, the covariance matrix calculation means 302 calculates the matrix $$S = \begin{bmatrix} Srr & Srb \\ Srb & Sbb \end{bmatrix} \quad (21)$$

Next, skin color hue line detecting means 303 calculates the skin color hue line as the first principle component axis of this statistical distribution, i.e., as a proper vector with the maximum proper value. Specifically, TanValue=tan 2θ is calculated from the relation $$\tan 2\theta = 2Srb/(Sbb-Srr) \quad (22)$$

where θ is the angle formed by the hue line that is the principle component axis and the positive BY axis. To simplify the calculation, the skin color hue line detecting means 303 substitutes TanValue rather than directly obtaining θ.

Figure 9:
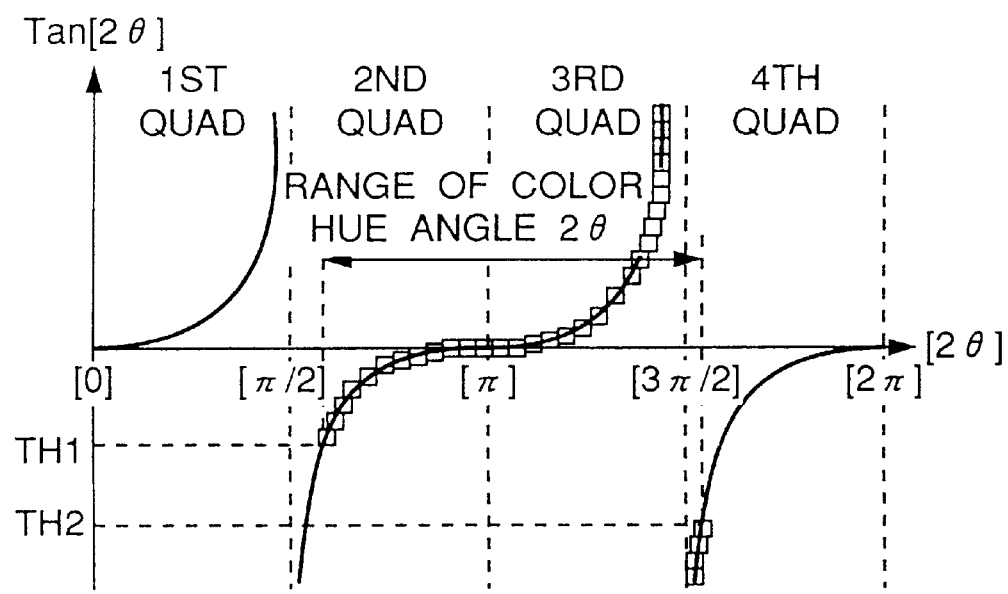
FIG. 9 is a diagram of the principle for evaluating the presence range of the skin color hue angle in the gradation correction apparatus of the preferred embodiment.

Next, the skin color hue angle presence region detecting means 304 determines whether the hue angle θ of the skin color line is present within a predefined range. The problem here is the multi-valued functionality of Tan−1, but this problem can be solved if the quadrant in which 2θ is present is considered as follows. The quadrant in which 2θ is present in FIG. 8(B), a conceptual diagram showing the presence region of skin color hue angle 2θ, and FIG. 9, a graph showing the principle for determining the presence region of the skin color hue angle, is determined as follows:

Srb>=0 and (Sbb−Srr)>=0, =>1st quadrant
Srb>=0 and (Sbb−Srr)<0, =>2nd quadrant
Srb<0 and (Sbb−Srr)<0, =>3rd quadrant
Srb<0 and (Sbb−Srr)>=0, =>4th quadrant In the present invention it is assumed that the region of angle θ of the detected skin color hue line is the region from π/4 to π shown as the shaded area of the simple color difference chromaticity diagram as shown in FIG. 8(A). Therefore, 2θ is twice that range, and is the range from π/2 to 2π of tan 2θ as shown in FIG. 8(B). As a result, 2θ is present from the second quadrant through the third quadrant to the fourth quadrant as shown by the angle of the shaded area in FIG. 8(B), and cannot occur in the first quadrant. Using this property, specifying the range of angle θ can be substituted for threshold value processing of TanValue=tan 2θ. The relationship between 2θ and tan 2θ is shown in FIG. 9. Because the linearity and single-valueness of tan 2θ are maintained in the second and third quadrants and part of the fourth quadrant in FIG. 9, threshold values TH1 and TH2 can be obtained from this figure based on the preceding argument. The output of the skin color hue angle presence region detecting means 304 is as shown below:

if (TanValue>TH1 or TanValue<TH2)
    then skin color
else
    not skin color.

However, TH1 must be greater than TH2, and if this condition is not satisfied, then single-valueness will not be maintained.

The skin color candidate block center of gravity processing means 305 calculates the center of gravity of the position of the skin color candidate blocks. This process is introduced as a threshold value process for the center of gravity position to prevent false evaluation of "desks", "ground" and such in the bottom area of the picture as regions similar in color to skin color. If the center of gravity position is (hada_gcenterX, hada_gcenterY) in block coordinates (x,y), $$hada\_gcenterX = \frac{1}{hada\_num}\sum_{x=0}^{9}\sum_{y=0}^{6} x \quad (23)$$

(for x: Zin_tbl[x][y] = 1)

$$\text{hada\_gcenter}Y = \frac{1}{\text{hada\_num}} \sum_{x=0}^{9} \sum_{y=0}^{6} y \quad (24)$$

(for y: Zin_tbl[x][y] = 1)

The final people evaluation processing means 306 accomplishes the final evaluation of whether the input image is a people picture or not based on the following evaluation criteria. Specifically, when both of the conditions:

(1) the output from the skin color hue angle presence region detecting means 304 is within one of the three following ranges:

(a) 2θ is in the second quadrant, and TanValue>TH1, (b) 2θ is in the third quadrant, (c) 2θ is in the fourth quadrant, and TanValue<th1, (2) the output from the skin color candidate block center of gravity processing means 305 is in the following range:

hada_gcenterY<hada_gcenter_max (i.e., the on-screen Y coordinate of the skin color center of gravity is in the image above the fourth block) are satisfied, the input image is determined to be a people picture scene, and is otherwise determined to not be a people picture scene.

This is the people presence evaluation 109 of the people evaluation means 104.

The skin color luminance processing means 307 obtains the average skin color brightness hada_Y of the skin color candidate blocks to obtain the degree of people. The average of the (highlight luminance)+(average luminance) of the skin color candidate is obtained only for those blocks for which array Zin_tbl[ ][ ] is 1.

$$\text{hada\_}Y = \frac{1}{2 \times \text{hada\_num}} \sum_{x=0}^{9} \sum_{y=0}^{6} \{(WP\_YY[x][y]) + (AV\_YY[x][Y])\} \quad (25)$$

(for x, y: Zin_tbl[x][y] == 1)

The total degree of people calculating means 308 determines the "darkest skin color luminance" hada_most_dark and the "brightest skin color luminance" hada_most_light by referencing the "skin luminance" obtained from image processing tests, and normalizes hada_Y between hada_most_dark and hada_most_light.

$$\text{degree of people (Zinbustudo)} = \quad (26)$$
$$\frac{[(\text{hada\_most\_light}) - (\text{hada\_}Y)]}{[(\text{hada\_most\_light}) - (\text{hada\_most\_dark})]} \times 255$$

When the people presence evaluation is NO, the degree of people=0.

This is the people degree 111.

The category classifying means 105 and scene information determination means 106 are described in detail next. The category classifying means 105 combines the backlighting presence evaluation 108 and degree of backlighting 110 information to classify the input image as one of four categories: "backlight YES, people YES," "backlight YES, people NO," "backlight NO, people YES," "backlight NO, people NO." Based on the selected category information, the scene information determination means 106 determines the degree of reliability of three features of the image scene, i.e., "backlit scene," "people scene," "other," required to synthesize the correction curve for gradation correction. The sum of the degrees of reliability is 1. The value of the degree of reliability takes a method predetermined for each category. For example, if an image is determined to be associated with the "backlight YES, people YES" category, the three types of degrees of reliability are automatically determined, and the degree of reliability is therefore not calculated for each image as are the degree of backlighting and the degree of people. A preprocess for first obtaining the correspondence between categories and degrees of reliability is therefore necessary.

Figure 10:
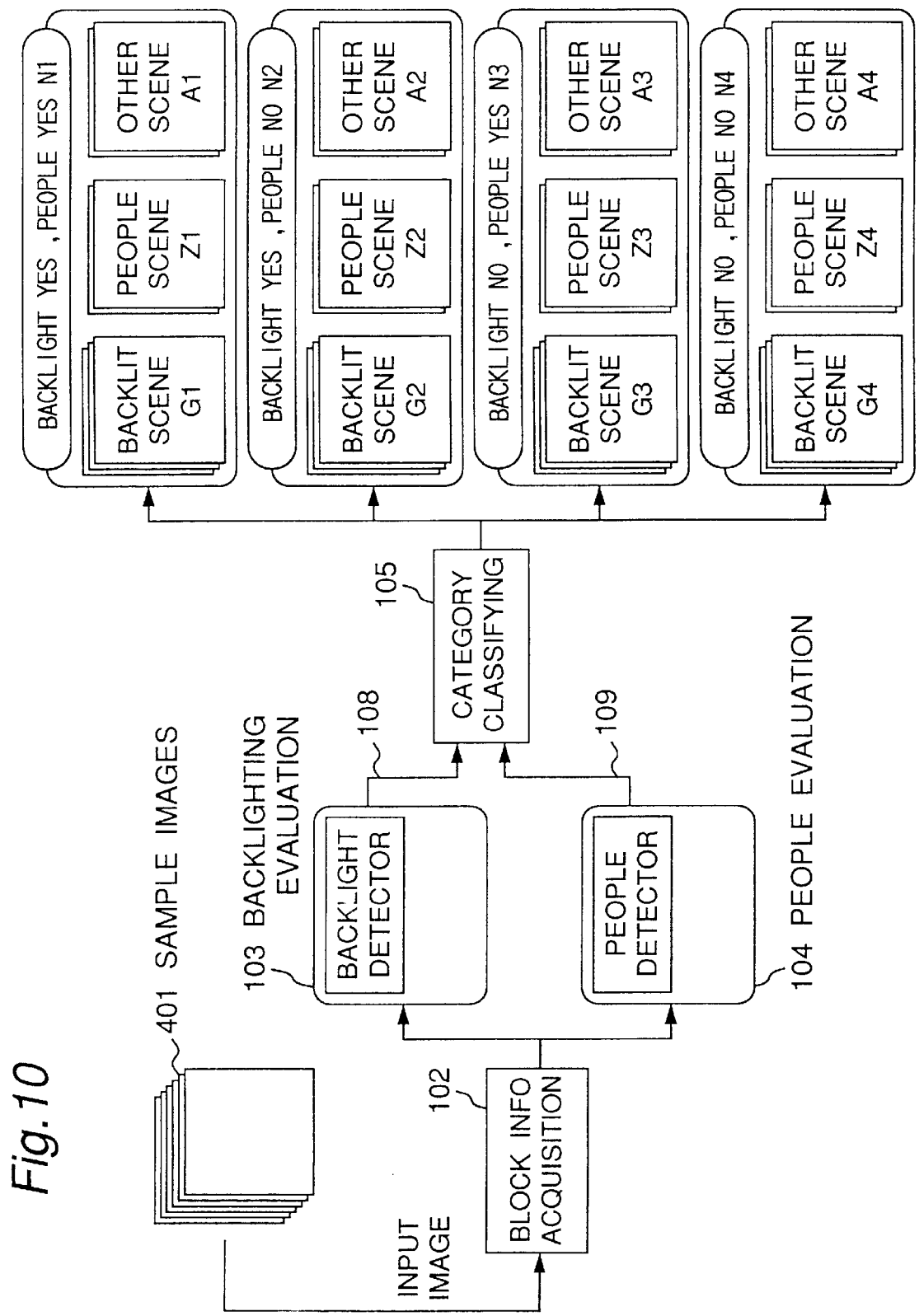
FIG. 10 is a block diagram showing the preprocess required for degree of reliability calculation in the gradation correction apparatus of the preferred embodiment.

This preprocess is described below with reference to FIG. 10, a block diagram showing the preprocess for degree of reliability calculation. In FIG. 10 the sample images 401 are the plural images used for this preprocessing. These images are labelled by subjective evaluation by a person as a "backlit image," "person image," or "other image" (background, still objects, etc. are all labelled "other").

The backlighting evaluation means 103 executes the process of the backlighting presence evaluation means 103a for each of these samples to output the backlighting presence evaluation 108, and the people evaluation means 104 simultaneously executes the process of the people presence evaluation means 104a to output the people presence evaluation 109. The category classifying means 105 then automatically classifies each sample as one of the $2^2=4$ categories, i.e., "backlight YES, people YES," "backlight YES, people NO," "backlight NO, people YES," "backlight NO, people NO", based on the combination of these of these two features, "backlit scene," and "people scene." After processing all of the sample images, a total N1 image samples are assigned to the "backlight YES, people YES" category as shown in FIG. 4, including G1 images labelled by subjective evaluation as a "backlit image," Z1 images similarly labelled as a "person image," and A1 images similarly labelled as an "other" image. The degrees of reliability in the "backlight YES, people YES" category are respectively defined as follows.

$$\text{backlighting degree of reliability} = \frac{G1}{N1} \quad (27)$$

$$\text{people degree of reliability} = \frac{Z1}{N1}$$

$$\text{other degree of reliability} = \frac{A1}{N1} = \frac{N1 - G1 - Z1}{N1}$$

The degrees of reliability in the "backlight YES, people NO" category are similarly:

$$\text{backlighting degree of reliability} = \frac{G2}{N2} \quad (28)$$

$$\text{people degree of reliability} = \frac{Z2}{N2}$$

$$\text{other degree of reliability} = \frac{A2}{N2} = \frac{N2 - G2 - Z2}{N2}$$

The degrees of reliability in each of the other categories are similarly defined. The scene information determination means 106 determines the degree of reliability of the input image based on the degree of reliability of each feature obtained by the preprocessing operation thus described.

The information determined by the scene information determination means 106 is transferred to the selection means 64A (FIG. 17), and one of three 8-bit data buses is selected. As a result, the scene information determination means 106 selects one of the basic density gradation tables 63A, 63B, 63C calculated and compiled for each scene by the same method shown in FIG. 13 of the first embodiment.

The present embodiment selects the basic density gradation correction table with the highest degree of reliability for the respective scene information, and when the degrees of reliability are equal, selects, in sequence, people, backlighting, and other.

Then, based on the degree information selected by the degree information selection means 64B, the table modification means 65 performs interior division or exterior division of the basic density gradation table (FIG. 16A) of the scene selected by the selection means 64A with the gradation information (FIG. 16D) when correction is not applied, and outputs the corrected density gradation information (FIG. 16B) optimized for the input image. Then, the output of the correction means 65 is applied as an address to the luminance table conversion means 66, which constitutes a table outputting the luminance corresponding to an input density, and conversion of the density table to a luminance table (FIG. 16C) is accomplished. The converted luminance table is then stored as table information to the memory constituting the gradation correction means 6, and after all gradation information is stored to memory, the address of the memory constituting the luminance correction means 5 is switched to input luminance 7, and the data to output luminance 8. The gradation corrected luminance information is then obtained from the luminance correction means 5 by applying to the memory constituting the luminance correction means 5 the luminance information converted by A/D conversion to 8-bit digital data.

The correction means 65 is described in detail below using FIG. 18.

Figure 18:
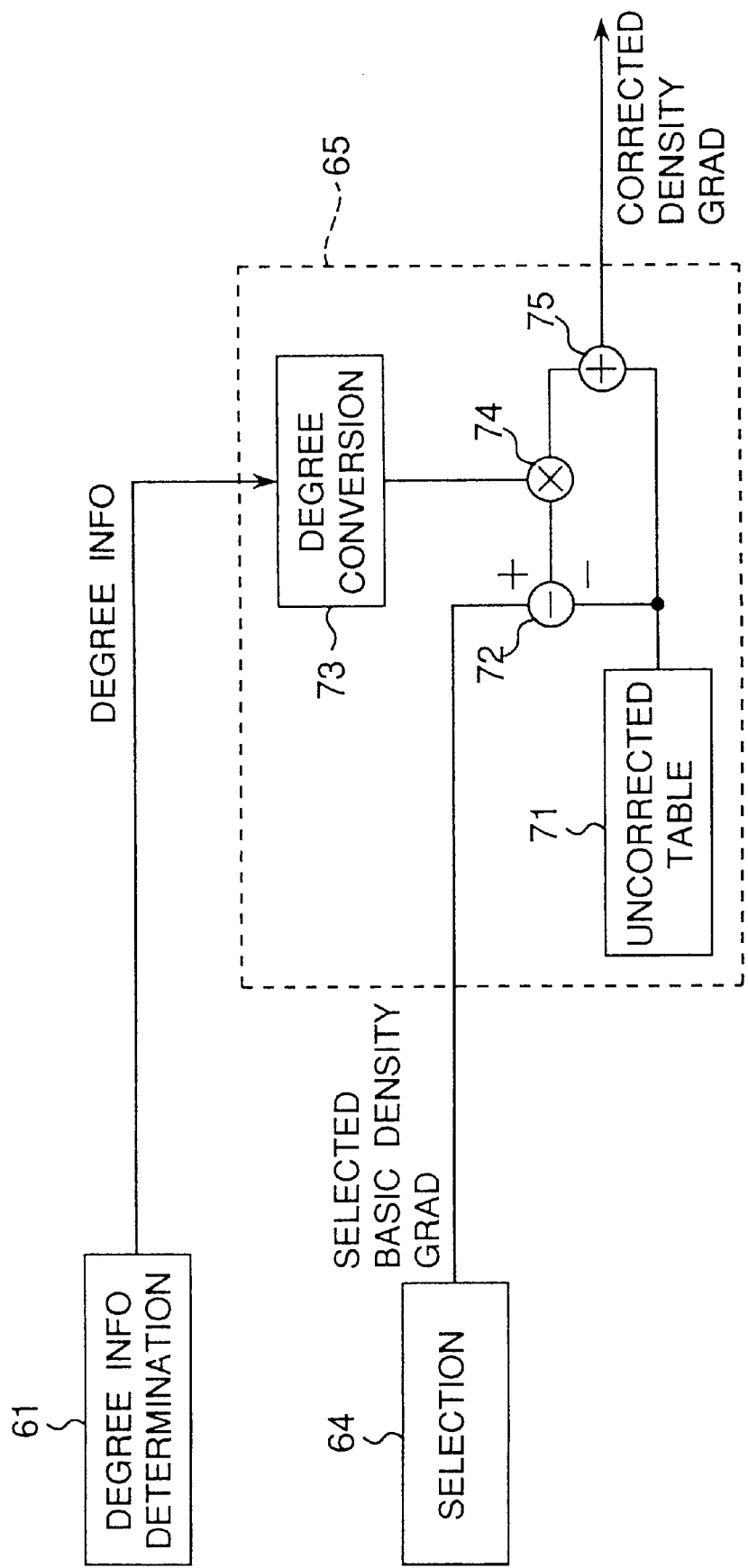
FIG. 18 is a block diagram of the correction means in the second embodiment of the present invention.

In FIG. 18, 71 is the table memory to which the uncorrected information is stored; 72 is a subtracter obtaining the difference between the basic density gradation selected by the selection means 64, and the uncorrected information; 73 is a degree conversion means for converting the degree of brightness determined by the degree information determination means 61 to an interior division ratio or an exterior division ratio; 74 is a multiplier for multiplying the output of the difference means and the output of the degree conversion means; and 75 is an adder for adding the output of the multiplier and the output of the uncorrected information.

The operation of the correction means 65 thus comprised is described below.

First, the subtracter 72 calculates the difference between the basic density gradation selected by the selection means 64, and the uncorrected information precalculated and compiled in a table. The degree conversion means 73 then converts the degree of brightness determined by the degree information determination means 61 to the form of an interior division ratio or exterior division ratio; the multiplier 74 then multiplies this interior division ratio or exterior division ratio with the output of the difference means, and by then adding the output of the multiplier and the output of the uncorrected information, interior division or exterior division of the basic density gradation information with the uncorrected information is accomplished according to the degree.

The specific effects of the present embodiment are described next.

As described with respect to the prior art above, it is necessary to optimize gradation reproducibility using the density in the case of hard copy output because of differences in the visual characteristics of monitors and hard copy. However, this is difficult to achieve using the density only, and knowledge relating to hard copy output is required.

By means of the present embodiment, there is a basic density gradation table of density input/density output information appropriate to the scene, this table is modified based on a degree to generate a gradation correction table suited to the input image, and gradation correction is accomplished. As a result, gradation reproduction appropriate to the input image can be achieved without knowing about hard copy output by means of an extremely simple method whereby a scene of the input image and the difference between the brightness of the input image and the gradation characteristic that is the basis for each scene are input as a degree of plural steps.

It is also possible by means of the present embodiment to flexibly handle images where there is a difference between the basic scene characteristics and the input image by accomplishing an interior division or exterior division operation between the gradation characteristic that is the basis for the scene and the uncorrected.

Fine optimization of gradation reproducibility can also be accomplished by means of the present embodiment by combining the basic density gradation information and plural lines of different slopes.

Furthermore, by smoothly connecting the break points between the plural lines of different slopes, the present embodiment can achieve by an extremely simple operation methods requiring extremely complex operations such as continuously varying the gamma value in the luminance input/luminance output system, and the continuity of gradation can be maintained.

The present embodiment can also optimize the gradation reproducibility of intermediate tones emphasized particularly in hard copy output, and optimize the gradation reproducibility of the low density region where changes are easily perceived, by means of an extremely simple method, i.e., by determining the basic density gradation information by specifying the unchanged density and slope of the low density correction line defining low density reproducibility and the intermediate density correction line defining intermediate density reproducibility.

Furthermore, because the basic density gradation information is precalculated and compiled in tables, it is not necessary to calculate the basic density gradation, and the present embodiment can therefore achieve high speed processing.

A gradation correction apparatus according to the third embodiment of the present invention is described below.

Figure 19:
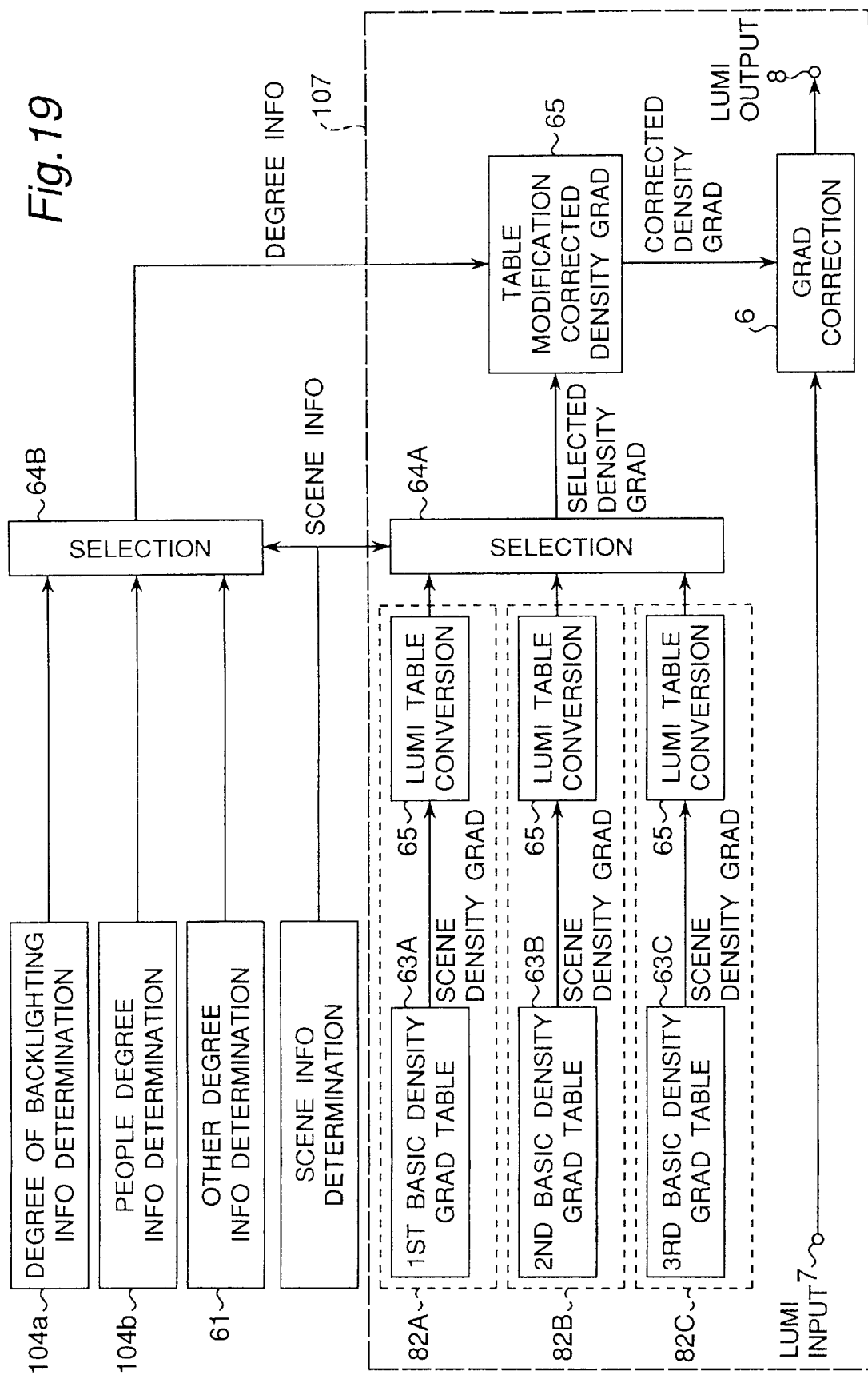
FIG. 19 is a block diagram of a gradation correction apparatus in a third embodiment of the present invention.

FIG. 19 is a block diagram of a gradation correction apparatus according to the third embodiment of the present invention wherein 104b is a people degree information determination means for determining the degree of brightness information for people in the input image;

103b is the degree of backlighting information determination means for determining the degree of brightness information of backlighting in the input image;

61 is the other degree information determination means for determining the other degree information in the input image;

63A is a first basic density gradation generation table comprising the basic density gradation information for density input/density output when the scene is a people picture;

63B is a second basic density gradation table comprising the basic density gradation information for density input/density output when the scene is a backlit picture;

63C is a third basic density gradation table comprising the basic density gradation information for density input/density output when the scene is a picture other than people or backlighting;

81 is a luminance table conversion means for converting the basic density gradation information of basic density gradation tables 63A, 63B, 63C to the basic luminance gradation information for the corresponding luminance input/luminance output;

64A is a selection means for selecting the gradation correction information appropriate to the scene of the input image from the output of the respective degree information determination means 63A, 63B, and 63C according to the scene information determined by the scene information determination means 106;

64B is a selection means for selecting the degree of brightness information of a scene in the input image from the respective basic density gradation tables 103b, 104b, and 61;

65 is a table modification means for modifying the luminance gradation table selected by the selection means 64A according to the degree of brightness information selected by the degree selection means 64B;

and 6 is a gradation correction means comprising the luminance gradation table modified by the table modification means 65, and outputting the corrected luminance information 8 after correcting the luminance information of the input image 7.

The operation of a gradation correction apparatus thus comprised is described below using FIG. 19.

The degree of information determination means 103b, 104b, and 61, and the scene information determination means 106, are identical in operation to those shown in the second embodiment above, and each respectively outputs the degree of brightness information and scene information.

The basic density gradation tables 63A, 63B, and 63C are also identical to those of the second embodiment, and each respectively outputs the basic density gradation tables.

Then, the basic density gradation tables 63A, 63B, and 63C are converted to the basic luminance gradation tables of respective luminance inputs/luminance outputs by the luminance table conversion means 81. The luminance table conversion means 81 is identical to that of the second embodiment. In the present embodiment, the basic density gradation tables and the luminance table conversion means are precalculated, and respectively constitute tables 82A, 82B, 82C. Thus, the input luminance 7 is corrected by the selection means 64, correction means 65, and luminance correction means 6, which are constituted and operate identically to those of the second embodiment, and the corrected luminance information 8 is output.

The specific effects of the present embodiment are described next.

The effects of the present embodiment are identical to those of the second embodiment, but, in addition, the present embodiment can constitute by means of a single table memory the table memory of the basic density gradation generating means of the second embodiment and the table memory of the density-luminance conversion means because the basic density gradation information is precalculated and converted to luminance information compiled in tables; the circuit configuration is therefore simplified, and cost can be reduced.

A gradation correction apparatus according to the fourth embodiment of the present invention is described below.

Figure 20:
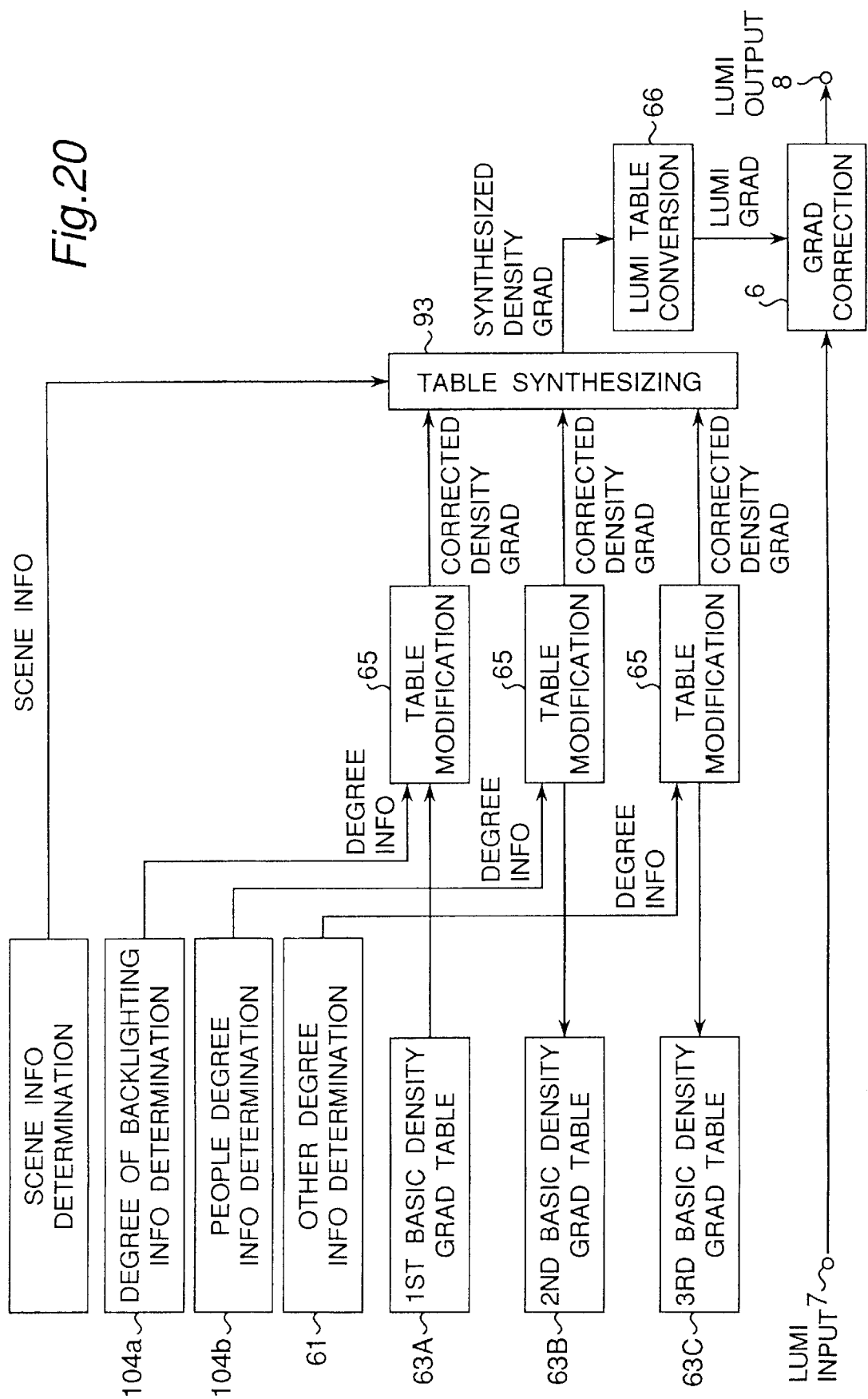
FIG. 20 is a block diagram of a gradation correction apparatus in a fourth embodiment of the present invention.

FIG. 20 is a block diagram of a gradation correction apparatus according to the fourth embodiment of the present invention wherein 104b is a people degree information determination means for determining the degree of brightness information for people in the input image;

103b is the degree of backlighting information determination means for determining the degree of brightness information of backlighting in the input image;

61 is the other degree information determination means for determining the other degree information in the input image;

63A is a first basic density gradation table comprising the basic density gradation information for density input/density output when the scene is a people picture;

63B is a second basic density gradation generation table comprising the basic density gradation information for density input/density output when the scene is a backlit picture;

63C is a third basic density gradation generation table comprising the basic density gradation information for density input/density output when the scene is a picture other than people or backlighting;

65 is a table modification means for modifying the respective density gradation table according to the degree of brightness information determined for each scene by the degree of information determination means 103b, 104b, and 61;

93 is a table synthesizing means for synthesizing density gradation tables modified for each scene based on the respective scene information determined by the scene information determination means 106;

66 is a luminance table conversion means for converting the density gradation table synthesized by the table synthesizing means 93 to the luminance gradation information for luminance input/luminance output; and 6 is a luminance correction means comprising the luminance gradation table converted by the luminance table conversion means 66, and outputting the corrected luminance information 8 after correcting the luminance information of the input image 7 by means of the same configuration as the second embodiment.

Figure 21:
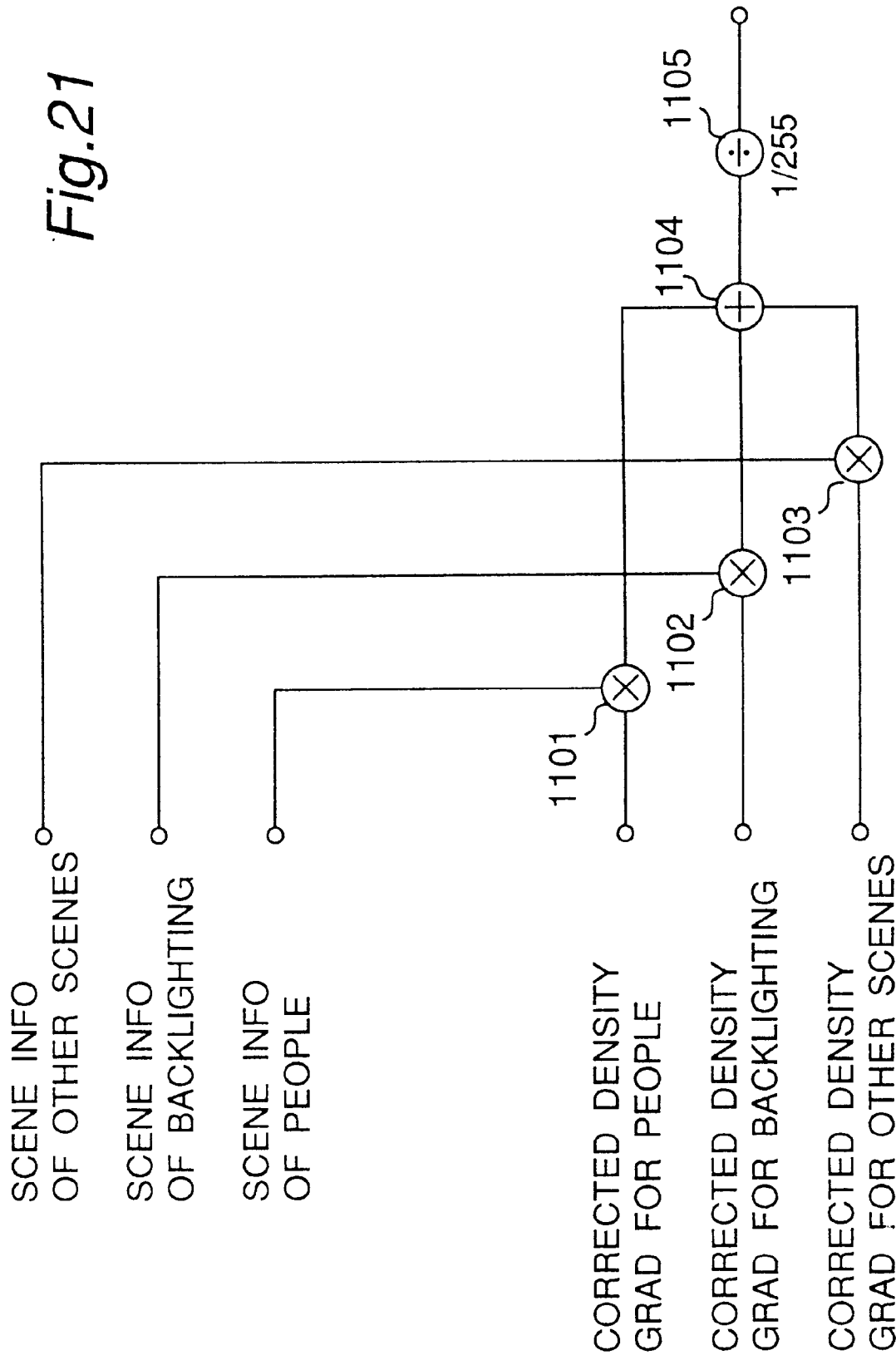
FIG. 21 is a block diagram of the synthesizing means in the fourth embodiment of the present invention.

The operation of a gradation correction apparatus thus comprised is described below using FIG. 20 and FIG. 21.

The scene information determination means 106, and the degree of information determination means 103b, 104b, and 61, are identical in operation to those shown in the second embodiment above, and each respectively outputs the degree of brightness information and scene information.

The basic density gradation tables 63A, 63B, and 63C also comprise the basic density gradation table for each scene as in the second embodiment.

The basic density gradation information of the basic density gradation tables 63A, 63B, and 63C is then converted for each scene by the table modification means 65 executing the same operation as that of the second embodiment based on the degree of brightness information determined for each scene by the degree of information determination means 103b, 104b, and 61.

The table modification means outputs are then synthesized to a single merged density gradation table by the table synthesizing means 93 based on the information determined for each scene by the scene information determination means.

Then, after conversion to a table of luminance input/luminance output information by the luminance table conversion means 66 as in the second embodiment, correction of the input luminance 7 is accomplished by the selection means 64, correction means 65, and luminance correction means 6, which are constituted and operate identically to those of the second embodiment.

The synthesizing means 93 is described in detail next using FIG. 21, wherein:

1101 is a multiplier for multiplying the scene information of people determined by the scene information determination means 106 with the corrected basic density gradation information for people;

1102 is a multiplier for multiplying the scene information of backlit scenes determined by the scene information determination means 106 with the corrected basic density gradation information for backlighting;

1103 is a multiplier for multiplying the scene information of other scenes determined by the scene information determination means 106 with the corrected basic density gradation information for other scenes;

1104 is an adder for adding the scene information with the product information of the corrected gradation information; and 1105 is a divider for matching the range of adder 1104 outputs with the corrected gradation information.

The operation of the synthesizing means 93 thus comprised is described below.

The people, backlighting, and other scene information determined by the scene information determination means 106 is used as is as the mixing ratio for multiplication by the respective multipliers 1101, 1102, and 1103 with the values of the basic density gradation tables modified by the table modification means. These three synthesis values are then summed by the adder 1104. The output of the adder 1104 is then divided by a value of 256 by the divider 1105 to match the range of corrected density gradations because a value in a range of a maximum 256 times the respective corrected density gradation information is output as the output of the adder 1104.

It is to be noted that in the present embodiment division by the divider 1105 is accomplished by means of an 8-bit shift because the output of the adder 1104 is increased by a maximum 256 times multiple as a result of merging three scenes.

The specific effects of the present embodiment are described next. The effects of the present embodiment are identical to those of the second embodiment, but, in addition, the present embodiment can flexibly correct even images for which the input image cannot be clearly classified in a specific category because a synthesized density gradation table of density input/density output information is compiled by merging respective scenes.

A gradation correction apparatus according to the fifth embodiment of the present invention is described below.

FIG. 22 is a block diagram of a gradation correction apparatus according to the fourth embodiment of the present invention wherein 104b is a people degree information determination means for determining the degree of brightness information for people in the input image;

103b is the degree of backlighting information determination means for determining the degree of brightness information of backlighting in the input image;

61 is the other degree information determination means for determining the other degree information in the input image;

106 is a scene information determination means for determining the scene information corresponding to the respective scenes of the input image;

63A is a first basic density gradation table comprising the basic density gradation information table for when the scene is a people picture;

63B is a second basic density gradation table comprising the basic density gradation information table for when the scene is a backlit picture;

63C is a third basic density gradation table comprising the basic density gradation information table for when the scene is a picture other than people or backlighting;

66 is a luminance table conversion means for converting the density gradation information of the basic density gradation tables 63A, 63B, 63C to luminance tables of the corresponding luminance input/luminance output information;

65 is a table modification means for modifying the basic density gradation table according to the degree of brightness information determined by the degree of information determination means 92;

93 is a synthesizing means for synthesizing corrected density tables modified for each scene based on the respective scene information determined by the scene information determination means 106; and 6 is a luminance correction means for outputting the corrected luminance information 8 after correcting the luminance information of the input image 7 by means of the same configuration as the second embodiment based on the luminance gradation table synthesized by the synthesizing means 93.

The operation of a gradation correction apparatus thus comprised is described below.

The degree of information determination means 103b, 104b, and 61, and the scene information determination means 106, are identical in operation to those shown in the second embodiment above, and each respectively outputs the degree of brightness information and scene information.

The basic density gradation generating means 63A, 63B, and 63C also comprise the respective basic density gradation tables as in the second embodiment.

The basic density gradation information of the basic density gradation tables 63A, 63B, and 63C is then converted by the luminance table conversion means 66 to the basic luminance gradation table of respective luminance input/luminance output information. In this embodiment the basic density gradation tables and the luminance table conversion means are precalculated and constituted as respective tables 1111A, 1111B, and 1111C. Correction of the input luminance 7 is then accomplished by means of the synthesizing means 93, correction means 65, and luminance correction means 6, which are constituted and operate identically to those of the fourth embodiment.

The specific effects of the present embodiment are described next.

The effects of the present embodiment are identical to those of the fourth embodiment, but, in addition, the present embodiment can constitute by means of a single table memory the table memory of the basic density gradation generating means of the fourth embodiment and the table memory of the density-luminance conversion means because the basic density gradation information is precalculated and converted to luminance information compiled in tables; the circuit configuration is therefore simplified, and cost can be reduced.

As described hereinabove, the present invention:

Generates gradation correction information suited to image scenes using the density for each scene, determines backlit scenes and people scenes from the input image, selects or synthesizes the gradation correction information based on this scene information, accomplishes modifications based on the degree of brightness information, and corrects the luminance of the input image, and can thus achieve gradation correction appropriate to hard copy output and appropriate to the image scene;

Can evaluate backlit scenes with higher precision than the prior art because in the backlighting evaluation the present invention evaluates backlit scenes from the shape and luminance of dark areas without assuming the presence of the backlit subject in the image center, and can therefore obtain a reliable value even in the degree of backlighting because peoples faces are inferred for evaluation; and Can accomplish the people evaluation relatively unaffected by variations in lighting even through evaluation is based on a skin color evaluation because the present invention uses a method obtaining the skin color distribution by means of a principal component analysis method including skin color gradations based on candidate data from the chromaticity, and evaluates using that angle.

What is claimed is:

1. A backlit scene detecting method for detecting a backlit scene in an input image comprising the steps of:
   dividing the input image into a plurality of blocks aligned in a plurality of columns and a plurality of rows;
   detecting a luminance of each block;
   detecting dark blocks among the plurality of blocks, each dark block having a detected luminance which is smaller than a predetermined luminance;
   counting a number of first continuous dark blocks in each row which extend from a right side edge of the input image and obtaining a first sum (S0) of the number of first continuous dark blocks from all the rows;
   counting a number of second continuous dark blocks in each row which extend from a left side edge of the input image and obtaining a second sum (S1) of the number of second continuous dark blocks from all the rows;
   counting a number of third continuous dark blocks in each column which extend from a top side edge of the input image and obtaining a third sum (S2) of the number of third continuous dark blocks from all the columns;
   counting a number of fourth continuous dark blocks in each column which extend from a bottom side edge of the input image and obtaining a fourth sum (S3) of the number of fourth continuous dark blocks from all the columns; and
   determining that the input image is a backlit scene when either one of the following two conditions is satisfied:
   (i) when the fourth sum (S3) is the greatest of the first to fourth sums; and
   (ii) when the third sum (S2) is the greatest and the fourth sum (S3) is the second greatest of the first to fourth sums.

2. A backlit scene detector for detecting a backlit scene in an input image comprising:
   dividing means for dividing the input image into a plurality of blocks aligned in a plurality of columns and a plurality of rows;
   luminance detecting means for detecting a luminance of each block;
   dark block detecting means for detecting dark blocks among the plurality of blocks, each dark block having a detected luminance which is smaller than a predetermined luminance;
   dark block processing means for counting a number of first continuous dark blocks in each row which extend from a right side edge of the input image and obtaining a first sum (S0) of the number of first continuous dark blocks from all the rows, for counting a number of second continuous dark blocks in each row which extend from a left side edge of the input image and obtaining a second sum (S1) of the number of second continuous dark blocks from all the rows, for counting a number of third continuous dark blocks in each column which extend from a top side edge of the input image and obtaining a third sum (S2) of the number of third continuous dark blocks from all the columns, and for counting a number of fourth continuous dark blocks in each column which extend from a bottom side edge of the input image and obtaining a fourth sum (S3) of the number of fourth continuous dark blocks from all the rows; and
   backlit scene detecting means for detecting that the input image is a backlit scene when either one of the following two conditions is satisfied:
   (i) the fourth sum (S3) is the greatest of the first to fourth sums; and
   (ii) the third sum (S2) is the greatest and the fourth sum (S3) is the second greatest of the first to fourth sums.

3. A backlit scene detector according to claim 2, wherein said luminance detecting means calculates a total average which is an average of the detected luminances of all the plurality of blocks, and wherein said predetermined luminance is the total average.

4. A backlit scene detector according to claim 2, wherein said luminance detecting means calculates a dark portion average which is an average of the detected luminances in the dark blocks, and wherein said backlit scene detecting means further detects that the input image is a backlit scene when said dark portion average is smaller than said predetermined luminance.

5. A backlit scene detector according to claim 2, wherein said luminance detecting means calculates a dark portion average which is an average of the detected luminances in the dark blocks, a light portion average which is an average of the detected luminances in the plurality of blocks other than said dark blocks, and a ratio of said light portion average to said dark portion average, and wherein said backlit scene detecting means further detects that the input image is a backlit scene when said ratio is greater than a predetermined amount.

6. A backlit scene detector according to claim 2, further comprising:
   dark block saturation processing means for obtaining a saturation of each of said dark blocks; and
   block detection changing means for changing a designation of a dark block to a non-dark block when the dark block has a saturation which is smaller than a predetermined saturation.

7. A backlit scene detector according to claim 2, further comprising:
   gravity center detection means for detecting a geometrical gravity center of a dark area covered by said dark blocks;
   person's face determining means for identifying a person's face when both of the following two conditions are satisfied:
   (a) the geometrical gravity center is located within said dark area; and
   (b) the third sum (S2) is the greatest and the fourth sum (S3) is the second greatest of the first to fourth sums;
   luminance calculating means for calculating an average luminance of the dark blocks located below said geometrical gravity center and within three columns in which the center column of the three columns contains the gravity center, said average luminance being considered as an average luminance of a person's face.

8. A backlit scene detector according to claim 2, further comprising:
   gravity center detection means for detecting a geometrical gravity center of a dark area covered by said dark blocks;
   person's face determining means for identifying a person's face when both of the following two conditions are satisfied:
   (a) the geometrical gravity center is located within said dark area; and
   (b) the fourth sum (S3) is the greatest of the first to fourth sums;

luminance calculating means for calculating an average luminance of the dark blocks located above said gravity center and within three columns in which the center column of three columns contains the gravity center, said average luminance being considered as an average luminance of a person's face.

9. A backlit scene detector according to claim 2, further comprising:

gravity center detection means for detecting a geometrical gravity center of a dark area covered by said dark blocks;

person's face determining means for identifying a person's face when the geometrical gravity center is located outside said dark area; and luminance calculating means for calculating an average luminance of the dark blocks located above said gravity center, said average luminance being considered as an average luminance of a person's face.

10. A people scene detecting method for detecting a people scene in an input image, comprising the steps of:

dividing the input image into a plurality of blocks aligned in a plurality of columns and a plurality of rows;

detecting the following values for each block, (a) an average value AV which is an average value of the colors in each block, and expressed by $$AV_{13}\ YY[x][y],\ AV\_RY[x][y],\ AV\_BY[x][y]$$

wherein $AV_{13}\ YY[x][y]$ is an average luminance, $AV\_RY[x][y]$ is an average color difference R–G, and $AV\_BY[x][y]$ is an average color difference B–G, (b) a WP value which is the color of a pixel where the luminance is the highest in each block, and expressed by $WP\_YY[x][y]$, $WP\_RY[x][y]$, $WP\_BY[x][y]$ wherein $WP\_YY[x][y]$ is a highest luminance, $WP\_RY[x][y]$ is a highest color difference R–G, and $WP\_BY[x][y]$ is a highest color difference B–G, (c) a BP value which is the color of a pixel where the luminance is the lowest in each block, and expressed by $$BP\_YY[x][y],\ BP\_RY[x][y],\ BP\_BY[x][y]$$

wherein $BP\_YY[x][y]$ is a lowest luminance, $BP\_RY[x][y]$ is a lowest color difference R–G, and $BP\_BY[x][y]$ is a lowest color difference B–G;

selecting skin color blocks which satisfy a condition that the WP value and the average value AV are both in a second quadrant of a simple chromaticity diagram;

calculating averages av_ry and av_by of RY and BY, respectively, in accordance with the following equations, $$ry\_av = \frac{\sum_{x,y} WP\_RY[x][y] + \sum_{x,Y} BP\_RY[x][y] + \sum_{x,y} AV\_RY[x][y]}{3 \times hada\_num}$$

$$by\_av = \frac{\sum_{x,y} WP\_BY[x][y] + \sum_{x,Y} BP\_BY[x][y] + \sum_{x,y} AV\_BY[x][y]}{3 \times hada\_num}$$

wherein hada_num is the number of selected skin color blocks;

calculating variances Srr and Sbb of RY and BY, respectively, in accordance with the following equations, $$Srr = \sum_{x,y}(WP\_RY[x][y] - ry\_av)^2 +$$
$$\sum_{x,y}(BP\_RY[x][y] - ry\_av)^2 +$$
$$\sum_{x,y}(AV\_RY[x][y] - ry\_av)^2$$

$$Sbb = \sum_{x,y}(WP\_BY[x][y] - by\_av)^2 +$$
$$\sum_{x,y}(BP\_BY[x][y] - by\_av)^2 +$$
$$\sum_{x,y}(AV\_BY[x][y] - by\_av)^2$$

calculating covariance Srb in accordance with the following equation, $$Srb = \sum_{x,y}(WP\_RY[x][y] - ry\_av) \times (WP\_BY[x][y] - by\_av) +$$
$$\sum_{x,y}(BP\_RY[x][y] - ry\_av) \times (BP\_BY[x][y] - by\_av) +$$
$$\sum_{x,y}(AV\_RY[x][y] - ry\_av) \times (AV\_BY[x][y] - by\_av)$$

calculating a matrix S in accordance with the following equation, $$S = \begin{bmatrix} Srr & Srb \\ Srb & Sbb \end{bmatrix}$$

calculating a proper vector, tan 2θ, in accordance with the following equation, $$\tan 2\theta = \frac{2Srb}{(Sbb - Srr)}$$

where θ is an angle formed by a hue line that is the principle component axis and the positive BY axis;

detecting that the input image is a people scene when angle θ is in a range from π/4 to π in the simple color difference chromaticity diagram.

11. A people scene detector for detecting a people scene in an input image, comprising:

dividing means for dividing the input image into a plurality of blocks aligned in a plurality of columns and a plurality of rows;

detecting means for detecting the following values for each block, (a) an average value AV which is an average value of the colors in each block, and expressed by $$AV_{13}\ YY[x][y],\ AV\_RY[x][y],\ AV\_BY[x][y]$$

wherein $AV\_YY[x][y]$ is an average luminance, $AV\_RY[x][y]$ is an average color difference R–G, and $AV\_BY[x][y]$ is an average color difference B–G, (b) a WP value which is the color of a pixel where the luminance is the highest in each block, and expressed by WP_YY[x][y], WP_RY[x][y], WP_BY[x][y]

wherein WP_YY[x][y] is a highest luminance, WP_RY[x][y] is a highest color difference R-G, and WP_BY[x][y] is a highest color difference B-G, (c) a BP value which is the color of a pixel where the luminance is the lowest in each block, and expressed by BP_YY[x][y], BP_RY[x][y], BP_BY[x][y]

wherein BP_YY[x][y] is a lowest luminance, BP_RY[x][y] is a lowest color difference R-G, and BP_BY[x][y] is a lowest color difference B-G;

block selecting means for selecting skin color blocks which satisfy that the WP value and the average value AV are both in a second quadrant of a simple chromaticity diagram;

average calculation means for calculating averages av_ry and av_by of RY and BY, respectively, in accordance with the following equations, $$ry\_av = \frac{\sum_{x,y} WP\_RY[x][y] + \sum_{x,Y} BP\_RY[x][y] + \sum_{x,y} AV\_RY[x][y]}{3 \times \text{hada\_num}}$$

$$by\_av = \frac{\sum_{x,y} WP\_BY[x][y] + \sum_{x,Y} BP\_BY[x][y] + \sum_{x,y} AV\_BY[x][y]}{3 \times \text{hada\_num}}$$

wherein hada_num is the number of selected skin color blocks;

variance calculation means for calculating variances Srr and Sbb of RY and BY, respectively, in accordance with the following equations, $$Srr = \sum_{x,y}(WP\_RY[x][y] - ry\_av)^2 +$$
$$\sum_{x,y}(BP\_RY[x][y] - ry\_av)^2 +$$
$$\sum_{x,y}(AV\_RY[x][y] - ry\_av)^2$$

$$Sbb = \sum_{x,y}(WP\_BY[x][y] - by\_av)^2 +$$
$$\sum_{x,y}(BP\_BY[x][y] - by\_av)^2 +$$
$$\sum_{x,y}(AV\_BY[x][y] - by\_av)^2$$

covariance calculation means for calculating covariance Srb in accordance with the following equation, $$Srb = \sum_{x,y}(WP\_RY[x][y] - ry\_av) \times (WP\_BY[x][y] - by\_av) +$$
$$\sum_{x,y}(BP\_RY[x][y] - ry\_av) \times (BP\_BY[x][y] - by\_av) +$$
$$\sum_{x,y}(AV\_RY[x][y] - ry\_av) \times (AV\_BY[x][y] - by\_av)$$

matrix calculation means for calculating a matrix S in accordance with the following equation, $$S = \begin{bmatrix} Srr & Srb \\ Srb & Sbb \end{bmatrix}$$

proper vector calculation means for calculating a proper vector, tan 2θ, in accordance with the following equation, $$\tan 2\theta = 2Srb/(Sbb - Srr)$$

where θ is an angle formed by a hue line that is the principle component axis and the positive BY axis;

people scene detecting means for detecting that the input image is a people scene when angle θ is in a range from π/4 to π in the simple color difference chromaticity diagram.

12. A people scene detector according to claim 11, further comprising:

gravity center detection means for detecting a gravity center of an area covered by said selected blocks; and said people scene detecting means for detecting that the input image is a people scene when said gravity center is located above a predetermined row in said input image.

13. A people scene detector according to claim 11, further comprising:

skin color luminance processing means for calculating an average Aav of said average values AV in the selected blocks, an average Awp of said WP values in the selected blocks, and an average skin brightness hada_Y by averaging said averages Aav and Awp;

degree of people detection means for detecting whether or not said hada_Y is within a predetermined brightness range.

14. A gradation correction apparatus for correcting the gradation of luminance in an input image comprising:

a scene information determination means for determining a scene information of the input image, said scene information determination means comprising a backlit scene detector for detecting a backlit scene in the input image, said backlit scene detector comprising:

dividing means for dividing the input image in to a plurality of blocks aligned in a plurality of columns and a plurality of rows;

luminance detecting means for detecting a luminance of each block;

dark block detecting means for detecting dark blocks among the plurality of blocks, each dark block having luminance which is smaller than a predetermined luminance;

dark block processing means for counting a first number of continuous dark blocks in each row which extend from a right side edge of the input image and obtaining a first sum (S0) of the first number of continuous dark blocks from all the rows, for counting a second number of continuous dark blocks in each row which extend from a left side edge of the input image and obtaining a second sum (S1) of the second number of continuous small blocks from all the rows, for counting a third number of continuous dark blocks in each column which extend from a top side edge of the input image and obtaining a third sum (S2) of the third number of continuous small blocks from all the columns, and for counting a third number of continuous dark blocks in each column which extend from a bottom side edge of the input image and obtaining a fourth sum (S3) of the fourth number of continuous small blocks from all the rows; and backlit scene detecting means for detecting that the input image is a backlit scene when either one of the following two conditions is satisfied:
  (i) the fourth sum (S3) is the greatest of the first to fourth sums; and
  (ii) the third sum (S2) is the greatest and the fourth sum (S3) is the second greatest of the first to fourth sums;

a degree of backlit scene brightness information determination means for determining a degree of backlit scene brightness in the input image detected as a backlit scene; a backlit basic density gradation table generating means for generating a backlit basic density gradation table;

a table modification means for modifying the backlit basic density gradation table based on said degree of backlit scene brightness to generate a backlit modified density gradation table;

a luminance table conversion means for converting said backlit modified density gradation table to a luminance table; and a gradation correction means for correcting the luminance gradation of the input image using said luminance table.

15. A gradation correction apparatus according to claim 14, wherein said scene information determination means further comprises a people scene detector for detecting a people scene in the input image, said people scene detector comprising:

detecting means for detecting the following values for each of the plurality of blocks,
  (a) an average value AV which is an average value of the colors in each block, and expressed by AV_YY[x][y], AV_RY[x][y], AV_BY[x][y]

wherein $AV_{13}$ YY[x][y] is an average luminance, AV_RY[x][y] is an average color difference R–G, and AV_BY[x][y] is an average color difference B–G, (b) a WP value which is the color of a pixel where the luminance is the highest in each block, and expressed by WP_YY[x][y], WP_RY[x][y], WP_BY[x][y]

wherein WP_YY[x][y] is a highest luminance, WP_RY[x][y] is a highest color difference R–G, and WP_BY[x][y] is a highest color difference B–G, (c) a BP value which is the color of a pixel where the luminance is the lowest in each block, and expressed by BP_YY[x][y], BP_RY[x][y], BP_BY[x][y]

wherein BP_YY[x][y] is a lowest luminance, BP_RY[x][y] is a lowest color difference R–G, and BP_BY[x][y] is a lowest color difference B–G;

block selecting means (301) for selecting skin color blocks which satisfy a condition in which the WP value and the average value AV are both in a second quadrant of a simple chromaticity diagram;

average calculation means for calculating averages av_ry and av_by of RY and BY, respectively, in accordance with the following equations, $$ry\_av = \frac{\sum_{x,y} WP\_RY[x][y] + \sum_{x,Y} BP\_RY[x][y] + \sum_{x,y} AV\_RY[x][y]}{3 \times hada\_num}$$

$$by\_av = \frac{\sum_{x,y} WP\_BY[x][y] + \sum_{x,Y} BP\_BY[x][y] + \sum_{x,y} AV\_BY[x][y]}{3 \times hada\_num}$$

wherein hada_num is the number of selected skin color blocks;

variance calculation means for calculating variances Srr and Sbb of RY and BY, respectively, in accordance with the following equations, $$Srr = \sum_{x,y}(WP\_RY[x][y] - ry\_av)^2 +$$
$$\sum_{x,y}(BP\_RY[x][y] - ry\_av)^2 +$$
$$\sum_{x,y}(AV\_RY[x][y] - ry\_av)^2$$

$$Sbb = \sum_{x,y}(WP\_BY[x][y] - by\_av)^2 +$$
$$\sum_{x,y}(BP\_BY[x][y] - by\_av)^2 +$$
$$\sum_{x,y}(AV\_BY[x][y] - by\_av)^2$$

covariance calculation means for calculating covariance Srb in accordance with the following equation, $$Srb = \sum_{x,y}(WP\_RY[x][y] - ry\_av) \times (WP\_BY[x][y] - by\_av) +$$
$$\sum_{x,y}(BP\_RY[x][y] - ry\_av) \times (BP\_BY[x][y] - by\_av) +$$
$$\sum_{x,y}(AV\_RY[x][y] - ry\_av) \times (AV\_BY[x][y] - by\_av)$$

matrix calculation means for calculating a matrix S in accordance with the following equation, $$S = \begin{bmatrix} Srr & Srb \\ Srb & Sbb \end{bmatrix}$$

proper vector calculation means for calculating a proper vector, tan 2θ, in accordance with the following equation, $$\tan 2\theta = \frac{2Srb}{(Sbb - Srr)}$$

where θ is an angle formed by a hue line that is the principle component axis and the positive BY axis; and people scene detecting means for detecting that the input image is a people scene when angle θ is in a range from π/4 to π in the simple color difference chromaticity diagram.

16. A gradation correction apparatus according to claim 15, further comprising:
  a degree of people scene brightness information determination means for determining a degree of people scene brightness in the input image detected as a people scene;
  a people basic density gradation table generating means for generating a people basic density gradation table;
  first selecting means for selecting either one of said degree of backlit scene brightness and said degree of people scene brightness based on said scene information, and for producing a selected brightness; and
  second selecting means for selecting either one of said backlit basic density gradation table and said people basic density gradation table based on said scene information, and for producing a selected density gradation table;
  said table modification means for modifying the selected density gradation table based on said selected brightness to generate a backlit modified density gradation table.

17. A gradation correction apparatus according to claim 15, further comprising:
  a degree of people scene brightness information determination means for determining a degree of people scene brightness in the input image detected as a people scene;
  a people basic density gradation table generating means for generating a people basic density gradation table;
  said table modification means for modifying the backlit basic density gradation table based on said backlit scene brightness to generate a backlit modified density gradation table, and also for modifying the people basic density gradation table based on said people scene brightness to generate a people modified density gradation table;
  a synthesizing means for synthesizing said backlit modified density gradation table and said people modified density gradation table and for producing a synthesized brightness; and
  said table modification means for modifying the selected density gradation table based on said synthesized brightness to generate a backlit modified density gradation table.

18. A gradation correction apparatus for correcting the gradation of luminance in an input image, comprising:
  a scene information determination means for determining a scene information of the input image, said scene information determination means comprising a people scene detector for detecting a people scene in the input image, said people scene detector comprising:
    dividing means for dividing the input image into a plurality of blocks aligned in a plurality of columns and a plurality of rows;
    detecting means for detecting the following values for each block,
      (a) an average value AV which is an average value of the colors in each block, and expressed by $AV\_YY[x][y], AV\_RY[x][y], AV\_BY[x][y]$ wherein $AV\_YY[x][y]$ is an average luminance, $AV\_RY[x][y]$ is an average color difference R–G, and $AV\_BY[x][y]$ is an average color difference B–G, (b) a WP value which is the color of a pixel where the luminance is the highest in each block, and expressed by $WP\_YY[x][y], WP\_RY[x][y], WP\_BY[x][y]$ wherein $WP\_YY[x][y]$ is a highest luminance, $WP\_RY[x][y]$ is a highest color difference R–G, and $WP\_BY[x][y]$ is a highest color difference B–G, (c) a BP value which is the color of a pixel where the luminance is the lowest in each block, and expressed by $BP\_YY[x][y], BP\_RY[x][y], BP\_BY[x][y]$ wherein $BP\_YY[x][y]$ is a lowest luminance, $BP\_RY[x][y]$ is a lowest color difference R–G, and $BP\_BY[x][y]$ is a lowest color difference B–G;

block selecting means for selecting skin color blocks which satisfy a condition in which the WP value and the average value AV are both in a second quadrant of a simple chromaticity diagram;
  average calculation means for calculating averages av_ry and av_by of RY and BY, respectively, in accordance with the following equations, $$ry\_av = \frac{\sum_{x,y} WP\_RY[x][y] + \sum_{x,Y} BP\_RY[x][y] + \sum_{x,y} AV\_RY[x][y]}{3 \times \text{hada\_num}}$$

$$by\_av = \frac{\sum_{x,y} WP\_BY[x][y] + \sum_{x,Y} BP\_BY[x][y] + \sum_{x,y} AV\_BY[x][y]}{3 \times \text{hada\_num}}$$

wherein hada_num is the number of selected skin color blocks;
  variance calculation means for calculating variances Srr and Sbb of RY and BY, respectively, in accordance with the following equations, $$Srr = \sum_{x,y}(WP\_RY[x][y] - ry\_av)^2 + \sum_{x,y}(BP\_RY[x][y] - ry\_av)^2 + \sum_{x,y}(AV\_RY[x][y] - ry\_av)^2$$

$$Sbb = \sum_{x,y}(WP\_BY[x][y] - by\_av)^2 + \sum_{x,y}(BP\_BY[x][y] - by\_av)^2 + \sum_{x,y}(AV\_BY[x][y] - by\_av)^2$$

covariance calculation means for calculating covariance Srb in accordance with the following equation, $$Srb = \sum_{x,y}(WP\_RY[x][y] - ry\_av) \times (WP\_BY[x][y] - by\_av) + \sum_{x,y}(BP\_RY[x][y] - ry\_av) \times (BP\_BY[x][y] - by\_av) +$$

-continued $$\sum_{x,y}(AV\_RY[x][y]-ry\_av)\times(AV\_BY[x][y]-by\_av)$$

matrix calculation means for calculating a matrix S in accordance with the following equation, $$S=\begin{bmatrix} Srr & Srb \\ Srb & Sbb \end{bmatrix}$$

proper vector calculation means for calculating a proper vector, tan 2θ, in accordance with the following equation, $$\tan 2\theta = \frac{2Srb}{(Sbb-Srr)}$$

where θ is an angle formed by a hue line that is the principle component axis and the positive BY axis;

people scene detecting means for detecting that the input image is a people scene when angle θ is in a range from π/4 to π in the simple color difference chromaticity diagram, a degree of people scene brightness information determination means for determining a degree of people scene brightness in the input image detected as a people scene;

a people basic density gradation table generating means for generating a people basic density gradation table;

a table modification means for modifying the people basic density gradation table based on said degree of people scene brightness to generate a people modified density gradation table;

a luminance table conversion means for converting said people modified density gradation table to a luminance table; and a gradation correction means for correcting the luminance gradation of the input image using said luminance table.

19. A gradation correction apparatus for correcting the gradation of luminance in an input image comprising:

a scene information determination means for determining a scene information of the input image, said scene information determination means comprising a backlit scene detector for detecting a backlit scene in the input image, said backlit scene detector comprising:

dividing means for dividing the input image into a plurality of blocks aligned in a plurality of columns and a plurality of rows;

luminance detecting means for detecting a luminance of each block;

dark block detecting means for detecting dark blocks among the plurality of blocks, each dark block having a luminance which is smaller than a predetermined luminance;

dark block processing means for counting a first number of continuous dark blocks in each row which extend from a right side edge of the input image and obtaining a first sum (S0) of the first number of continuous dark blocks from all the rows, for counting a second number of continuous dark blocks in each row which extend from a left side edge of the input image and obtaining a second sum (S1) of the second number of continuous dark blocks from all the rows, for counting a third number of continuous dark blocks in each column which extend from a top side edge of the input image and obtaining a third sum (S2) of the third number of continuous dark blocks from all the columns, and for counting a fourth number of continuous dark blocks in each column which extend from a bottom side edge of the input image and obtaining a fourth sum (S3) of the fourth number of continuous dark blocks from all the rows; and backlit scene detecting means for detecting that the input image is a backlit scene when either one of the following two conditions is satisfied:

(i) the fourth sum (S3) is the greatest of the first to fourth sums; and (ii) the third sum (S2) is the greatest and the fourth sum (S3) is the second greatest of the first to fourth sums;

a degree of backlit scene brightness information determination means for determining a degree of backlit scene brightness in the input image detected as a backlit scene; a backlit basic density gradation table generating means for generating a backlit basic density gradation table;

a backlit luminance table conversion means for converting said backlit basic density gradation table to a backlit luminance table; and a table modification means for modifying the backlit luminance table based oh said degree of backlit scene brightness to generate a backlit modified luminance table;

a gradation correction means for correcting the luminance gradation of the input image using said modified luminance table.

20. A gradation correction apparatus according to claim 19, wherein said scene information determination means further comprises a people scene detector for detecting a people scene in the input image, said people scene detector comprising:

dividing means for dividing the input image into a plurality of blocks aligned in a plurality of columns and a plurality of rows;

detecting means for detecting the following values for each block, (a) an average value AV which is an average value of the colors in each block, and expressed by $AV_{13}$ YY[x][y], AV_RY[x][y], AV_BY[x][y]

wherein $AV_{13}$ YY[x][y] is an average luminance, AV_RY[x][y] is an average color difference R–G, and AV_BY[x][y] is an average color difference B–G, (b) a WP value which is the color of a pixel where the luminance is the highest in each block, and expressed by WP_YY[x][y], WP_RY[x][y], WP_BY[x][y]

wherein WP_YY[x][y] is a highest luminance, WP_RY[x][y] is a highest color difference R–G, and WP_BY[x][y] is a highest color difference B–G, (c) a BP value which is the color of a pixel where the luminance is the lowest in each block, and expressed by BP_YY[x][y], BP_RY[x][y], BP_BY[x][y]

wherein BP_YY[x][y] is a lowest luminance, BP_RY[x][y] is a lowest color difference R–G, and BP_BY[x][y] is a lowest color difference B–G;

block selecting means for selecting skin color blocks which satisfy a condition in which the WP value and the average value AV are both in a second quadrant of a simple chromaticity diagram;

average calculation means for calculating averages av_ry and av_by of RY and BY, respectively, in accordance with the following equations, $$ry\_av = \frac{\sum_{x,y} WP\_RY[x][y] + \sum_{x,Y} BP\_RY[x][y] + \sum_{x,y} AV\_RY[x][y]}{3 \times hada\_num}$$

$$by\_av = \frac{\sum_{x,y} WP\_BY[x][y] + \sum_{x,Y} BP\_BY[x][y] + \sum_{x,y} AV\_BY[x][y]}{3 \times hada\_num}$$

wherein hada_num is the number of selected skin color blocks;

variance calculation means for calculating variances Srr and Sbb of RY and BY, respectively, in accordance with the following equations, $$Srr = \sum_{x,y}(WP\_RY[x][y] - ry\_av)^2 +$$
$$\sum_{x,y}(BP\_RY[x][y] - ry\_av)^2 +$$
$$\sum_{x,y}(AV\_RY[x][y] - ry\_av)^2$$

$$Sbb = \sum_{x,y}(WP\_BY[x][y] - by\_av)^2 +$$
$$\sum_{x,y}(BP\_BY[x][y] - by\_av)^2 +$$
$$\sum_{x,y}(AV\_BY[x][y] - by\_av)^2$$

covariance calculation means for calculating covariance Srb in accordance with the following equation, $$Srb = \sum_{x,y}(WP\_RY[x][y] - ry\_av) \times (WP\_BY[x][y] - by\_av) +$$
$$\sum_{x,y}(BP\_RY[x][y] - ry\_av) \times (BP\_BY[x][y] - by\_av) +$$
$$\sum_{x,y}(AV\_RY[x][y] - ry\_av) \times (AV\_BY[x][y] - by\_av)$$

matrix calculation means for calculating a matrix S in accordance with the following equation, $$S = \begin{bmatrix} Srr & Srb \\ Srb & Sbb \end{bmatrix}$$

proper vector calculation means for calculating a proper vector, tan 2θ, in accordance with the following equation, $$\tan 2\theta = 2Srb/(Sbb - Srr)$$

where θ is an angle formed by a hue line that is the principle component axis and the positive BY axis;

people scene detecting means for detecting that the input image is a people scene when angle θ is in a range from π/4 to π in the simple color difference chromaticity diagram.

21. A gradation correction apparatus according to claim 20, further comprising:

a degree of people scene brightness information determination means for determining a degree of people scene brightness in the input image detected as a people scene;

a people basic density gradation table generating means for generating a people basic density gradation table;

a people luminance table conversion means for converting said people basic density gradation table to a people luminance table;

first selecting means for selecting either one of said degree of backlit scene brightness and said degree of people scene brightness based on said scene information, and for producing a selected brightness; and second selecting means for selecting either one of said backlit luminance table and said people luminance table, based on said scene information, and for producing a selected luminance table; and said table modification means for modifying the selected luminance table based on said selected brightness to generate said modified luminance table.

22. A gradation correction apparatus according to claim 20, further comprising:

a degree of people scene brightness information determination means for determining a degree of people scene brightness in the input image detected as a people scene;

a people basic density gradation table generating means for generating a people basic density gradation table;

a people luminance table conversion means for converting said people basic density gradation table to a people luminance table;

a table modification means for modifying the people luminance table based on said degree of people scene brightness to generate a people modified luminance table;

synthesizing means for synthesizing said backlit luminance table and said people luminance table to produce a synthesized luminance table; and said gradation correction means for correcting the luminance gradation of the input image using said synthesized luminance table.

23. A gradation correction apparatus for correcting the gradation of luminance in an input image, comprising:

a scene information determination means for determining a scene information of the input image, said scene information determination means comprising a people scene detector for detecting a people scene in the input image, said people scene detector comprising:

dividing means for dividing the input image into a plurality of blocks aligned in a plurality of columns and a plurality of rows;

detecting means for detecting the following values for each block, (a) an average value AV which is an average value of the colors in each block, and expressed by $AV_{13} YY[x][y], AV\_RY[x][y], AV\_BY[x][y]$ wherein $AV_{13} YY[x][y]$ is an average luminance, $AV\_RY[x][y]$ is an average color difference R–G, and $AV\_BY[x][y]$ is an average color difference B–G, (b) a WP value which is the color of a pixel where the luminance is the highest in each block, and expressed by $WP\_YY[x][y], WP\_RY[x][y], WP\_BY[x][y]$ wherein $WP\_YY[x][y]$ is a highest luminance, $WP\_RY[x][y]$ is a highest color difference R–G, and $WP\_BY[x][y]$ is a highest color difference B–G, (c) a BP value which is the color of a pixel where the luminance is the lowest in each block, and expressed by $BP\_YY[x][y], BP\_RY[x][y], BP\_BY[x][y]$ wherein $BP\_YY[x][y]$ is a lowest luminance, $BP\_RY[x][y]$ is a lowest color difference R–G, and $BP\_BY[x][y]$ is a lowest color difference B–G;

block selecting means for selecting skin color blocks which satisfy a condition in which the WP value and the average value AV are both in a second quadrant of a simple chromaticity diagram, average calculation means for calculating averages av_ry and av_by of RY and BY, respectively, in accordance with the following equations, $$ry\_av = \frac{\sum_{x,y} WP\_RY[x][y] + \sum_{x,y} BP\_RY[x][y] + \sum_{x,y} AV\_RY[x][y]}{3 \times hada\_num}$$

$$by\_av = \frac{\sum_{x,y} WP\_BY[x][y] + \sum_{x,y} BP\_BY[x][y] + \sum_{x,y} AV\_BY[x][y]}{3 \times hada\_num}$$

wherein hada_num is the number of selected skin color blocks;

variance calculation means for calculating variances Srr and Sbb of RY and BY, respectively, in accordance with the following equations, $$Srr = \sum_{x,y}(WP\_RY[x][y] - ry\_av)^2 + \sum_{x,y}(BP\_RY[x][y] - ry\_av)^2 + \sum_{x,y}(AV\_RY[x][y] - ry\_av)^2$$

$$Sbb = \sum_{x,y}(WP\_BY[x][y] - by\_av)^2 + \sum_{x,y}(BP\_BY[x][y] - by\_av)^2 + \sum_{x,y}(AV\_BY[x][y] - by\_av)^2$$

covariance calculation means for calculating covariance Srb in accordance with the following equation, $$Srb = \sum_{x,y}(WP\_RY[x][y] - ry\_av) \times (WP\_BY[x][y] - by\_av) + \sum_{x,y}(BP\_RY[x][y] - ry\_av) \times (BP\_BY[x][y] - by\_av) + \sum_{x,y}(AV\_RY[x][y] - ry\_av) \times (AV\_BY[x][y] - by\_av)$$

matrix calculation means for calculating a matrix S in accordance with the following equation, $$S = \begin{bmatrix} Srr & Srb \\ Srb & Sbb \end{bmatrix}$$

proper vector calculation means for calculating a proper vector, $\tan 2\theta$, in accordance with the following equation, $$\tan 2\theta = \frac{2Srb}{(Sbb - Srr)}$$

where $\theta$ is an angle formed by a hue line that is the principle component axis and the positive BY axis;

people scene detecting means for detecting that the input image is a people scene when angle $\theta$ is in a range from $\pi/4$ to $\pi$ in the simple color difference chromaticity diagram, a degree of people scene brightness information determination means for determining a degree of people scene brightness in the input image detected as a people scene;

a people basic density gradation table generating means for generating a people basic density gradation table;

a luminance table conversion means for converting said people basic density gradation table to a people luminance table; and a table modification means for modifying the people luminance table based on said degree of people scene brightness to generate a people modified luminance table;

a gradation correction means for correcting the luminance gradation of the input image using said people modified luminance table.

* * * * *